United States Patent [19]

Hansen et al.

[11] Patent Number: 5,352,774
[45] Date of Patent: Oct. 4, 1994

[54] DYES CONTAINING THIOPHENE RADICALS

[75] Inventors: Guenter Hansen; Ernst Schefczik, both of Ludwigshafen; Karl-Heinz Etzbach, Frankenthal; Helmut Reichelt, Niederkirchen; Hermann Loeffler, Speyer, all of Fed. Rep. of Germany

[73] Assignee: Sandoz AG, Basel, Switzerland

[21] Appl. No.: 125,666

[22] Filed: Sep. 23, 1993

Related U.S. Application Data

[60] Continuation of Ser. No. 884,472, May 13, 1992, Pat. No. 5,283,326, which is a continuation of Ser. No. 532,663, Jun. 4, 1990, abandoned, which is a division of Ser. No. 205,359, Jul. 27, 1988, abandoned, which is a division of Ser. No. 860,573, May 7, 1986, abandoned.

[30] Foreign Application Priority Data

| May 14, 1985 | [DE] | Fed. Rep. of Germany ....... 3517365 |
| Sep. 20, 1985 | [DE] | Fed. Rep. of Germany ....... 3533546 |
| Oct. 2, 1985 | [DE] | Fed. Rep. of Germany ....... 3535133 |

[51] Int. Cl.⁵ .................... C09B 29/033; C09B 29/40; D06P 1/18
[52] U.S. Cl. ........................ 534/766; 534/753
[58] Field of Search ............... 534/766, 753

[56] References Cited

U.S. PATENT DOCUMENTS

| 3,998,802 | 12/1976 | Dehnert et al. ............ 534/766 |
| 4,042,578 | 8/1977 | Dehnert et al. ............ 534/766 |
| 4,092,329 | 5/1978 | Jotterand .................... 534/753 X |
| 4,255,326 | 3/1981 | Giles et al. ................. 534/753 X |
| 4,264,495 | 4/1981 | Maher et al. ............... 534/753 |
| 4,507,407 | 3/1985 | Kluger et al. .............. 534/753 X |
| 4,668,775 | 5/1987 | Bergmann et al. ........ 534/766 X |
| 4,837,269 | 6/1989 | Etzbach et al. ............ 534/761 |
| 4,843,153 | 6/1989 | Eilingsfeld et al. ........ 534/752 |
| 4,855,412 | 8/1989 | Dehnert et al. ............ 534/766 |
| 4,855,413 | 8/1989 | Dehnert et al. ............ 534/766 |
| 4,904,777 | 2/1990 | Etzbach et al. ............ 534/738 |
| 4,994,564 | 2/1991 | Etzbach et al. ............ 534/766 |
| 5,132,411 | 7/1992 | Egli et al. .................. 534/753 |

FOREIGN PATENT DOCUMENTS

| 56-143245 | 11/1981 | Japan .................... 534/753 |
| 59-204658 | 1/1984 | Japan .................... 534/753 |
| 60-166345 | 8/1985 | Japan .................... 534/753 |
| 60-226556 | 11/1985 | Japan .................... 534/753 |
| 1394364 | 5/1975 | United Kingdom ....... 534/753 |
| 2011937 | 7/1979 | United Kingdom ....... 534/753 |
| 2125424 | 3/1984 | United Kingdom ....... 534/753 |
| 2163768 | 3/1986 | United Kingdom ....... 534/768 |

*Primary Examiner*—Robert W. Ramsuer
*Assistant Examiner*—Fiona T. Powers
*Attorney, Agent, or Firm*—Oblon, Spivak, McClelland, Maier & Neustadt

[57] ABSTRACT

The compounds of the general formula I

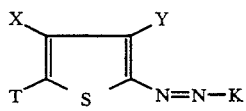

where X is fluorine, chlorine, bromine, SO₂E or unsubstituted or substituted hydroxyl or mercapto, E is alkyl, alkenyl, cycloalkyl, aralkyl, aryl, chlorine or unsubstituted or substituted hydroxyl or amino, Y is cyano, nitro, alkanoyl, aroyl, alkylsulfonyl, arylsulfonyl, carboxyl, a carboxylic ester group or unsubstituted or substituted carbamyl, T is hydrogen, $C_1$–$C_4$-alkyl, a radical which can be introduced by electrophilic substitution or a radical of the formula —CH=B, in which B is a radical of a methylene-active compound or of an amine, and K is a radical of a coupling component, are very useful for dyeing synthetic fibers or plastics.

17 Claims, No Drawings

DYES CONTAINING THIOPHENE RADICALS

This is a continuation of application Ser. No. 07/884,472, filed May 13, 1992, now U.S. Pat. No. 5,283,326 which is a continuation of application Ser. No. 07/532,663, filed Jun. 4, 1990, now abandoned which is division of application Ser. No. 07/205,359, filed Jul. 27, 1988, now abandoned, which is a division of application Ser. No. 06/860,573, filed May 7, 1986, now abandoned.

The present invention relates to compounds of the general formula I

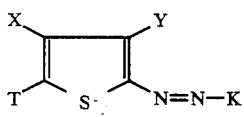

where X is fluorine, chlorine, bromine, $SO_2E$ or unsubstituted or substituted hydroxyl or mercapto, E is alkyl, alkenyl, cycloalkyl, aralkyl, aryl, chlorine or unsubstituted or substituted hydroxyl or amino, Y is cyano, nitro, alkanoyl, aroyl, alkylsulfonyl, arylsulfonyl, carboxyl, a carboxylic ester group or unsubstituted or substituted carbamyl, T is hydrogen, $C_1$-$C_4$-alkyl, a radical which can be introduced by electrophilic substitution or a radical of the formula —CH=B, in which B is a radical of a methylene-active compound or of an amine, and K is a radical of a coupling component.

Examples of radicals X, in addition to those stated above, are alkoxy, cycloalkoxy, aralkoxy and aryloxy, as well as the corresponding mercapto radicals. Specific examples are OH, $OCH_3$, $OC_2H_5$, $OC_3H_7$, $OC_4H_9$, $OCH_2C_6H_5$, $OC_6H_{11}$, $OC_6H_5$, $OC_6H_4CH_3$, $OC_6H_4Cl$, SH, $SCH_3$, $SC_2H_5$, $SC_3H_7$, $S_4H_9$, $SCH_2C_6H_5$, $SC_2H_4OH$, $SCH_2COOCH_3$, $SH_2COOC_2H_5$, $SC_6H_{11}$, $SC_6H_5$ and $SC_6H_4CH_3$.

E is, for example, $CH_3$, $C_2H_5$, $C_3H_7$, $C_4H_9$, $C_6H_{13}$, $C_6H_{11}$, $C_8H_{17}$, $C_6H_5$—$CH_2$, $C_6H_5$—$CH_2$—$CH_2$, $C_6H_5$, Cl—$C_6H_4$, $C_4H_9$—$C_6H_4$, Cl, OH, $CH_3O$, $C_2H_5O$, $C_3H_7O$, $C_4H_9O$, $C_6H_5$—$CH_2O$, $C_6H_5$—$CH_2$—$CH_2O$, $C_6H_5O$, $ClC_6H_4O$, $CH_3C_6H_4O$, $NH_2$, $NHCH_3$, $N(CH_3)_2$, $NHC_2H_5$, $N(C_2H_5)_2$, $NHC_4H_9$, $N(C_4H_9)_2$, $NHC_6H_5$, $NHC_6H_4$—$CH_3$, $NHC_6H_4Cl$ or $NCH_3C_6H_4$.

Specific examples of radicals Y, in addition to those stated above, are:

$CH_3CO$, $C_2H_5CO$, $C_3H_7CO$, $C_4H_9CO$, $C_5H_{11}CO$, $C_7H_{15}CO$, $OCCH\begin{smallmatrix}C_2H_5\\C_4H_9\end{smallmatrix}$, $C_6H_5CO$, $CH_3C_6H_4CO$, $ClC_6H_4CO$, $(CH_3)_2C_6H_3CO$, $H_3COC_6H_4CO$, $Cl_2C_6H_3CO$, $CH_3SO_2$, $C_2H_5SO_2$, $C_4H_9SO_2$, $C_6H_5SO_2$, $CH_3C_6H_4SO_2$, $ClC_6H_4SO_2$, $COOCH_3$, $COOC_2H_5$, $COOC_3H_7$, $COOC_4H_9$, $COOC_6H_{13}$, $COOC_8H_{17}$, $COOCH_2CH\begin{smallmatrix}C_2H_5\\C_4H_9\end{smallmatrix}$, $COOC_2H_4OH$, $COOC_3H_6OH$, $COOC_2H_4OCH_3$, $COOC_2H_4OC_2H_5$, $COOC_2H_4OC_4H_9$, $COOC_6H_5$, $COOC_6H_4CH_3$, $CONH_2$, $CONHCH_3$, $CONHC_2H_5$, $CONHC_4H_9$, $CONHC_6H_{13}$, $CONHC_8H_{17}$, $CON(CH_3)_2$, $CON(CH_3)_2$, $CON(C_2H_5)_2$, $CON(C_3H_7)_2$, $CON(C_4H_9)_2$,

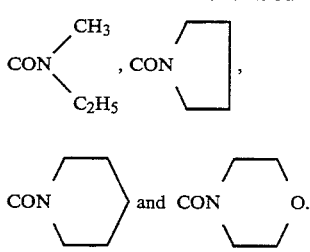

Examples of radicals T which can be introduced by electrophilic substitution are Cl, Br, NO, $NO_2$, $SO_3H$, CHO, CN and acyl, where acyl is, for example $CH_3CO$, $C_2H_5CO$, $C_6H_5CO$, $CH_3SO_2$, $C_2H_5SO_2$ or $C_6H_5SO_2$.

Methylene-active compounds of the formula $H_2B$ are, for example, compounds of the formula

where Z is cyano, nitro, alkanoyl, aroyl, alkylsulfonyl, arylsulfonyl, carboxyl, a carboxylic ester group or unsubstituted or substituted carbamyl or is a radical of a compound of the formula

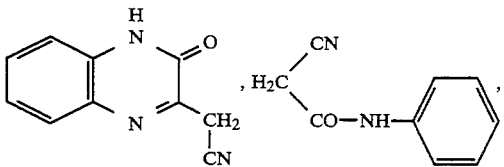

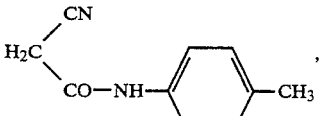

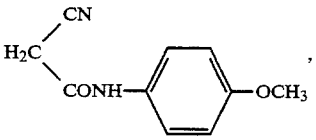

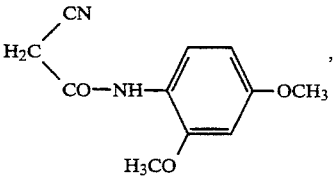

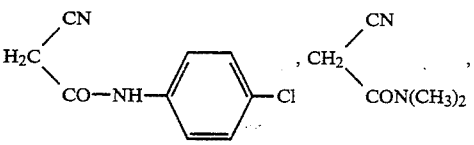

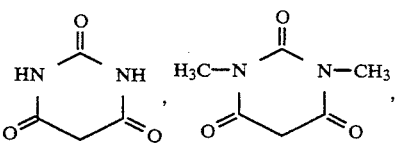

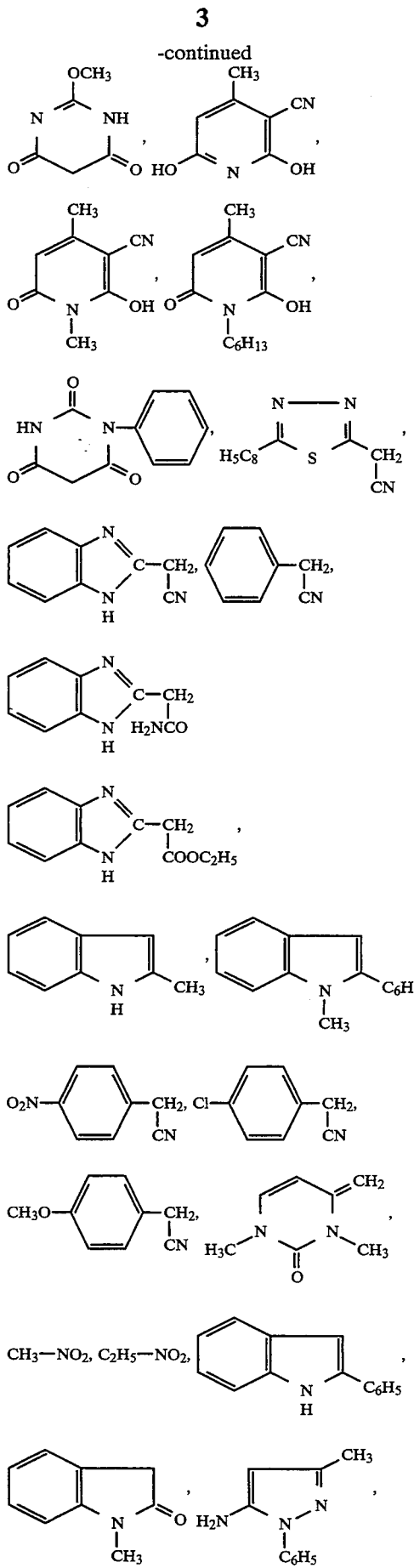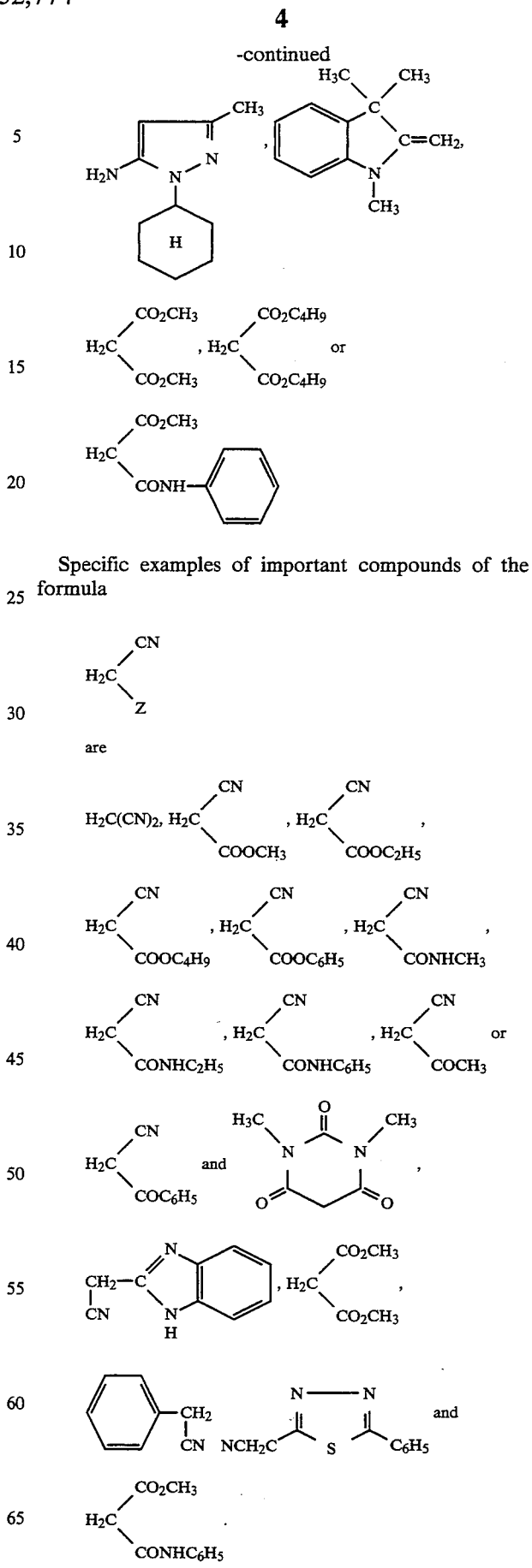
Specific examples of important compounds of the formula
$$H_2C\begin{matrix}CN\\Z\end{matrix}$$
are Examples of amine radicals B are =N—C₆H₅, =N—C₆H₄CH₃ or generally radicals of Schiff's bases of the amines.

Alkyl radicals T are, for example, CH₃, C₂H₅, C₃H₇ or C₄H₉.

The diazo components in which T is H or $C_1$-$C_4$-alkyl alkyl can be prepared by reacting a compound of the formula II

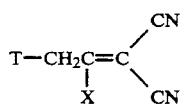

with a sulfur donor. Radicals T may be introduced into the diazo components in which T is H by electrophilic substitution by a conventional method.

Furthermore, the diazo component in which T is H and X is OH may be prepared by reacting the compound of the formula

with malodinitrile and then reacting the product with a sulfide.

The preparation of the diazo components is described in detail in European Patent Application 86102603.7.

The coupling components of the formula HK are preferably derived from the aniline, α-naphthylamine, pyrazole, aminopyrazole, indole, thiazole, thiophene, phenol, naphthol, tetrahydroquinoline, pyridone or pyridine series, those of the aniline, pyrazole, pyridine, thiophene and thiazole series being preferred.

The coupling components HK are in particular of the general formula

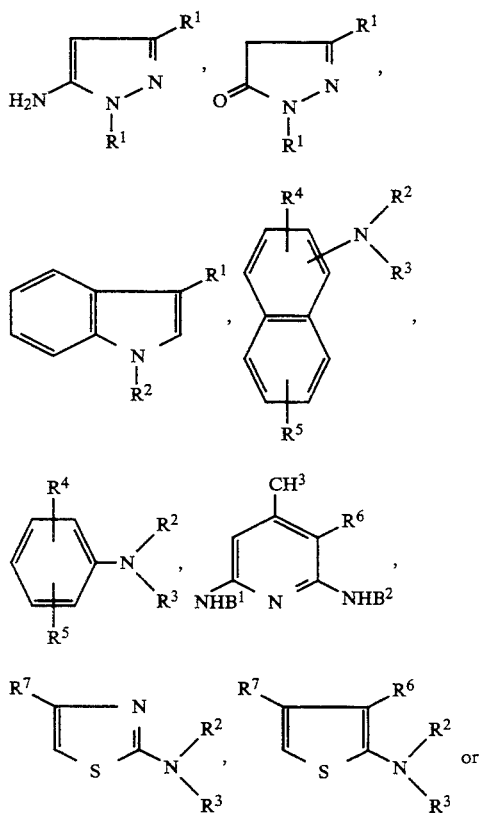

where $B^1$ is hydrogen or $B^2$, $B^2$ is unsubstituted or substituted alkyl, cycloalkyl, alkenyl, aryl or acyl, $R^1$ is hydrogen, alkyl, aralkyl or aryl, $R^2$ is hydrogen or $R^3$, $R^3$ is unsubstituted or substituted alkyl, cycloalkyl, alkenyl, aralkyl or aryl, $R^4$ and $R^5$ independently of one another are each hydrogen, alkyl, alkoxy, phenoxy, halogen, alkylsulfonylamino, dialkylaminosulfonylamino or acylamino, $R^6$ is cyano, carbamyl, nitro, acetyl or carbalkoxy and $R^7$ is unsubstituted or substituted phenyl, alkyl, aralkyl, halogen, substituted hydroxyl or mercapto.

Examples of radicals $B^2$, in addition to those stated above, are $C_1$-$C_6$-alkyl which may be substituted by chlorine, bromine, hydroxyl, $C_1$-$C_8$-alkoxy, phenoxy, phenyl, cyano, carboxyl, $C_1$-$C_8$-alkanoyloxy, $C_1$-$C_8$-alkoxy-$C_1$-$C_4$-alkoxy, benzoyloxy, o-, m- or p-methylbenzoyloxy, o-, m- or p-chlorobenzoyloxy, $C_1$-$C_8$-alkoxyalkanoyloxy, phenoxyalkanoyloxy, $C_1$-$C_8$-alkoxycarbonyloxy, $C_1$-$C_8$-alkoxyalkoxycarbonyloxy, benzyloxycarbonyloxy, phenethoxycarbonyloxy, phenoxyethoxycarbonyloxy, $C_1$-$C_8$-alkylaminocarbonyloxy, cyclohexylaminocarbonyloxy, phenylaminocarbonyloxy, $C_1$-$C_8$-alkoxycarbonyl, $C_1$-$C_8$-alkoxyalkoxycarbonyl, phenoxycarbonyl, benzyloxycarbonyl, phenoxy-$C_1$-$C_4$-alkoxy or phenylethoxycarbonyl, and phenyl and cyclohexyl.

Specific examples of radicals $B^2$ are:

1) Unsubstituted or substituted alkyl, such as

CH₃, C₂H₅, C₃H₇, CH(CH₃)₂, C₄H₉, CH₂CH(CH₃)₂, $\underset{\overset{|}{CH_3}}{CH}$—C₂H₅, C₅H₁₁, $\underset{\overset{|}{CH_3}}{CH}$—CH(CH₃)₂, CH(C₂H₅)₂, $\underset{\overset{|}{CH_3\ CH_3}}{\overset{CH_3}{|}}{CH}$—C₃H₇, CH—CH—CH₃, C₂H₄—CH(CH₃)₂, CH₂—$\underset{\overset{|}{CH_3}}{\overset{\overset{CH_3}{|}}{C}}$—CH₃, C₆H₁₃, C₇H₁₅, $\underset{\overset{|}{C_2H_5}}{CH}$—C₄H₉, CH$\overset{CH(CH_3)_2}{\underset{CH(CH_3)_2}{<}}$, $\underset{\overset{|}{CH_3}}{CH}$—C₂H₄—CH(CH₃)₂, C₈H₁₇, CH₂—$\underset{\overset{|}{C_2H_5}}{CH}$—C₄H₉ und $\underset{\overset{|}{CH_3}}{CH}$—C₃H₆—CH(CH₃)₂;

C₂H₄OH, C₃H₆OH, CH₂—$\underset{\overset{|}{CH_3}}{CH}$—OH, $\underset{\overset{|}{CH_3}}{CH}$—CH₂—OH, C₄H₈OH, $\underset{\overset{|}{CH_3}}{CH}$—C₂H₄—OH, $\underset{\overset{|}{CH_3}}{CH}$—CH₂—OH, C₆H₁₂OH, -continued $CH(CH_3)-C_3H_6C(CH_3)_2$ with OH;

$C_2H_4OCH_3$, $C_2H_4OC_2H_5$, $C_2H_4OC_3H_7$, $C_2H_4OC_4H_9$, $C_2H_4OC_6H_5$, $C_2H_4OC_6H_{11}$, $C_2H_4CN$, $C_5H_{10}CN$, $C_6H_{12}CN$, $C_2H_4OC_2H_4CN$, $C_3H_6OC_2H_4CN$, $C_3H_6OCH_3$, $C_3H_6OC_2H_5$ $C_3H_6OC_3H_7$, $C_3H_6OC_4H_9$, $C_3H_6OCH_2-CH(C_2H_5)-C_4H_9$, $C_3H_6OC_6H_{11}$, $C_3H_6OC_8H_{17}$, $C_3H_6OCH_2C_6H_5$, $C_3H_6OC_2H_4C_6H_5$, $C_3H_6OC_2H_4OC_6H_5$, $C_3H_6OC_6H_5$, $C_3H_6OC_2H_4OH$, $C_3H_6OC_4H_8OH$, $C_3H_6OC_2H_4OCH_3$, $C_3H_6OC_2H_4OC_2H_5$, $C_3H_6OC_2H_4OCH(CH_3)_2$, $C_3H_6OC_2H_4OC_4H_9$, $C_3H_6OC_2H_4OCH_2C_6H_5$, $C_3H_6OC_2H_4OC_6H_5$, $C_3H_6OC_4H_8OCH_3$, $C_3H_6OC_4H_8OC_2H_5$, $C_3H_6OC_4H_8OC_4H_9$, $CH(CH_3)-CH_2OCH_3$, $CH(CH_3)CH_2OC_4H_9$, $CH(CH_3)-CH_2OC_6H_5$, $CH(CH_3)CH_2OCH_2C_6H_5$, $CH(CH_3)-C_2H_4OCH_3$, $CH(C_2H_5)-CH_2-OCH_3$, $CH(CH_3)-CH(OCH_3)_2$, $CH_2CHOCH_3$ with $CH_3$, $CH_2-CH(CH_3)-OC_2H_5$, $CH_2-CH(CH_3)-OC_4H_9$ or $CH_2-CH(CH_3)-OC_6H_5$ and the corresponding radicals in which two $C_2H_4O$, $C_3H_6O$, $CH(CH_3)-CH_2O$ and $CH_2-CHO$ with $CH_3$ groups are present, and $C_3H_6OCH(CH_3)-CH_2OCH_3$, $C_3H_6OCH(CH_3)OC_2H_5$, $C_3H_6OCH_2CHOCH_3$ with $CH_3$ and $CH_2-(C_6H_{10}H)-CH_2-OH$.

2. Unsubstituted or substituted cycloalkyl:

cyclohexyl, cyclohexyl, cyclohexyl-$(CH_3)_{1-3}$, cyclohexyl-OH, cyclohexyl-$OC_2H_4-OH$ and cyclohexyl.

3. Unsubstituted or substituted aralkyl:

$CH_2-C_6H_5$, $C_2H_4-C_6H_5$, $CH_2CH(CH_3)-C_6H_5$, $CH(CH_3)C_2H_4-C_6H_5$, $C_2H_4CH(CH_3)-C_6H_5$, $CH_2CH(OH)-C_6H_5$, $CH(C_2H_5)-C_6H_5$ and $CH(C_3H_7)-C_6H_5$, and those radicals containing $C_6H_4CH_3$ and $C_6H_4OCH_3$ instead of $C_6H_5$.

4. Unsubstituted or substituted phenyl: $C_6H_5$, $C_6H_4CH_3$, $C_6H_3(CH_3)_2$, $C_6H_4OCH_3$, $C_6H_3(OCH_3)_2$, $C_6H_4Cl$ and $C_6H_2(OCH_3)_2Cl$.

5. The radicals $CH_2CH=CH_2$, $CH_2COOCH_3$, $(CH_2)_5COOCH_3$, $(CH_2)_5COOC_2H_5$, $(CH_2)_5COO-C_4H_9$, $(CH_2)_5COOCH_2CH(C_2H_5)(C_4H_9)$ and $(CH_2)_n-N$ (piperidone ring with C=O), where n is 2, 3, 4 or 6.

6. Acyloxy radicals: $(CH_2)_2OCHO$, $(CH_2)_2OCO(CH_2)_nCH_3$, $(C_2H_4O)_2CHO$, $(C_2H_4O)_2CO(CH_2)_nCH_3$, $(CH_2)_3O(CH_2)_2OCHO$, $(CH_2)_3O(CH_2)_2OCO(CH_2)_nCH_3$, $(CH_2)_2O(CH_2)_4OCHO$ and $(CH_2)_2O(CH_2)_4OCO(CH_2)_nCH_3$, where n is 0 to 7, $(CH_2)_2OCOCH(C_2H_5)(C_4H_9)$, $(CH_2)_2OCOC_6H_5$, $(CH_2)_2OCOC_6H_4CH_3$, $(CH_2)_2OCOC_6H_4Cl$, $(CH_2)_2OCONHCH_3$, $(CH_2)_2OCONHC_4H_9$, $(CH_2)_2OCONHCH_2CH(C_2H_5)(C_4H_9)$, $(CH_2)_2OCONHC_6H_5$, and the corresponding radicals containing $(CH_2)_3$ or $(CH_2)_4$ instead of $(CH_2)_2$.

7. Acyl radicals: CHO and $CH_3(CH_2)_nCO$, where n is from 0 to 7, $C_6H_5CO$, $CH_3C_6H_4CO$, $C_6H_5CH_2CO$, $C_6H_5OCH_2CO$, $CH_3SO_2$, $C_2H_5SO_2$, $C_6H_5SO_2$ and $CH_3C_6H_4SO_2$.

Specific examples of radicals $R^1$, in addition to those stated above, are methyl, ethyl, propyl, butyl, benzyl, phenethyl, phenyl, o-, m- and p-tolyl and o-, m- and p-chlorophenyl.

Examples of radicals $R^3$, in addition to those mentioned above, are $C_1$-$C_6$-alkyl which may be substituted by chlorine, bromine, hydroxyl, $C_1$-$C_8$-alkoxy, phenoxy, cyano, carboxyl, $C_1$-$C_8$-alkanoyloxy, $C_1$-$C_8$-alkoxy-$C_1$-$C_4$-alkoxy, benzoyloxy, o-, m- and p-methylbenzoyloxy, o-, m- and p-chlorobenzoyloxy, $C_1$-$C_8$-alkoxyalkanoyloxy, phenoxyalkanoyloxy, $C_1$-$C_8$-alkoxycarbonyloxy, $C_1$–$C_8$-alkoxyalkoxycarbonyloxy, benzyloxycarbonyloxy, phenylethoxycarbonyloxy, phenoxyethoxycarbonyloxy, $C_1$–$C_8$-alkylaminocarbonyloxy, cyclohexylaminocarbonyloxy, phenylaminocarbonyloxy, $C_1$–$C_8$-alkoxycarbonyl, $C_1$–$C_8$-alkoxyalkoxycarbonyl, phenoxycarbonyl, benzyloxycarbonyl, phenoxy-$C_1$–$C_4$-alkoxy or phenylethoxycarbonyl, and phenyl, benzyl, phenethyl and cyclohexyl.

Specific examples of radicals $R^3$ are methyl, ethyl, propyl, butyl, pentyl, hexyl, allyl, methallyl, 2-chloroethyl, 2-bromoethyl, 2-cyanoethyl, 2-hydroxyethyl, 2-phenyl-2-hydroxyethyl, 2,3-dihydroxypropyl, 2-hydroxypropyl, 2-hydroxybutyl, 2-hydroxy-3-phenoxypropyl, 2-hydroxy-3-methoxypropyl, 2-hydroxy-3-butoxypropyl, 3-hydroxypropyl, 2-methoxyethyl, 2-ethoxyethyl, 2-propoxyethyl, 2-butoxyethyl, 2-phenoxyethyl, 2-phenoxypropyl, 2-acetoxyethyl, 2-propionyloxyethyl, 2-butyryloxyethyl, 2-isobutyryloxyethyl, 2-methoxymethylcarbonyloxyethyl, 2-ethoxymethylcarbonyloxyethyl, 2-phenoxymethylcarbonlyoxyethyl, 2-methoxycarbonyloxyethyl, 2-ethoxycarbonyloxyethyl, 2-propoxycarbonyloxyethyl, 2-butoxycarbonyloxyethyl, 2-phenyloxycarbonyloxyethyl, 2-benzyloxycarbonyloxyethyl, 2-methoxyethoxycarbonyloxyethyl, 2-ethoxyethoxycarbonyloxyethyl, 2-propoxyethoxycarbonyloxyethyl, 2-butoxyethoxycarbonyloxyethyl, 2-methylaminocarbonyloxyethyl, 2-ethylaminocarbonyloxyethyl, 2-propylaminocarbonyloxyethyl, 2-butylaminocarbonyloxyethyl, 2-methoxycarbonylethyl, 2-ethoxycarbonylethyl, 2-propoxycarbonylethyl, 2-butoxycarbonylethyl, 2-phenoxycarbonylethyl, 2-benzyloxycarbonylethyl, 2-β-phenylethoxycarbonylethyl, 2-methoxyethoxycarbonylethyl, 2-ethoxyethoxycarbonylethyl, 2-propoxyethoxycarbonylethyl, 2-butoxyethoxycarbonylethyl, 2-phenoxyethoxycarbonylethyl and 2-benzoylethyl.

Examples of suitable radicals $R^4$ and $R^5$ are hydrogen, methyl, ethyl, propyl, bromine, chlorine, methoxy, ethoxy, phenoxy, benzyloxy and $C_1$–$C_4$-alkoxycarbonylamino, and benzoylamino or $C_1$–$C_6$-alkanoylamino which is unsubstituted or substituted by chlorine, bromine, cyano, methoxy, ethoxy or phenoxy, and $C_1$–$C_4$-alkylsulfonylamino or -dialkylaminosulfonylamino.

Examples of radicals $R^6$ in addition to those mentioned above are aminocarbonyl, methylaminocarbonyl, dimethylaminocarbonyl, ethylaminocarbonyl, diethylaminocarbonyl, methoxycarbonyl, ethoxycarbonyl, n- and isopropoxycarbonyl, n-, iso- and sec.-butoxycarbonyl, methoxyethoxycarbonyl ethoxyethoxycarbonyl, n- and isopropoxyethoxycarbonyl and n-, iso- and sec.-butoxyethoxycarbonyl.

Examples of radicals $R^7$ are $C_1$–$C_{10}$-alkyl, $C_1$–$C_{10}$-alkoxy, phenoxy, benzyloxy, phenyl, chlorine, bromine, nitro, $C_1$–$C_4$-alkoxycarbonyl, $C_1$–$C_4$-mono-and dialkylamino, $C_1$–$C_4$-alkoxyethoxy, $C_1$–$C_4$-alkyl- or phenylmercapto, $C_1$–$C_5$-alkanoylamino, such as acetylamino, propionylamino, butyrylamino or valerylamino, monosubstituted or polysubstituted phenyl, $C_1$–$C_4$-alkyl, $C_1$–$C_4$-alkoxycarbonylmethyl, cyanomethyl and benzyl.

The compounds of the formula I have yellow to greenish blue hues and are particularly useful for dyeing polyesters, nylons, cellulose esters and blends of polyesters and cellulose fibers. As a rule, the dyeings obtained have good or very good fastness properties, particularly on polyesters.

Dyes having a suitable constitution are dischargeable under reduced conditions and/or under alkaline and reducing conditions.

Suitable discharging agents are the conventionally used ones, for example tin(II) chloride, sodium bisulfite, sodium dithionite or hydroxymethanesulfonic acid. The discharge process too can be carried out in a conventional manner.

Some of the compounds of the formula I are very useful for dyeing thermoplastics, such as polystyrene, polymethacrylates, polycarbonates, nylon and styrene/acrylic acid/butadiene copolymers, since they possess high color strength and good lightfastness and heat resistance. Furthermore, many novel dyes can be used for dyeing and/or printing polyester/cotton blends by the process described in German Patent 1,811,796, the resulting dyeings having good lightfastness and fastness to washing.

The compounds of the formula I can be prepared by a conventional method. Details are given in the Examples, in which parts and percentages are by weight, unless started otherwise.

Of particular importance are compounds of the formulae I a

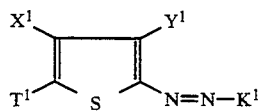

and I b

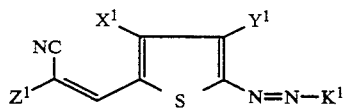

where $X^1$ is chlorine, bromine, hydroxyl, $C_1$–$C_4$-alkoxy or -alkylthio, methylsulfonyl, phenylsulfonyl, phenoxy or phenylthio, $Y^1$ and $Z^1$ are each cyano, a carboxylic ester group or substituted carbamyl, $T^1$ is formyl, nitro or cyano and $K^1$ is a radical of a coupling component of the aniline, thiazole, pyrazole, thiophene or pyridine series.

Compounds of the formulae Ia and Ib in which $X^1$ is chlorine, ethoxy or phenylmercapto, $Y^1$ is cyano, $T^1$ is formyl, $Z^1$ is cyano, a carboxylic ester group or substituted carbamyl and K is a radical of a coupling component of the aniline, thiazole, thiophene or pyridine series, are particularly useful industrially.

Other particularly important dyes are those of the general formula IIa

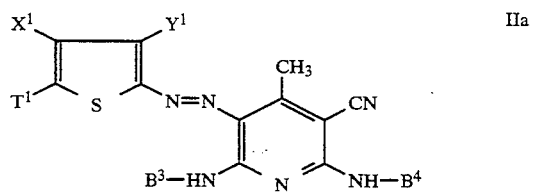

where $X^1$, $Y^1$ and $T^1$ have the stated meanings, $B^3$ is hydrogen or $B^4$, and $B^4$ is $C_2$–$C_8$-alkyl which may or may not be interrupted by oxygen and is unsubstituted or substituted by hydroxyl, $C_1$–$C_4$-alkanoyloxy, $C_1$–$C_4$-alkoxy, benzyloxy or phenoxy, or is phenyl which is unsubstituted or substituted by methyl or methoxy. Preferred carboxylic ester groups $Y^1$ are $COOCH_3$ and $COOC_2H_5$.

Examples of particularly preferred radicals $B^3$ and $B^4$ are hydrogen and $C_2H_5$, $C_3H_7$, $C_4H_9$,

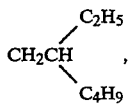

$C_6H_{11}$, $C_6H_5$, $C_6H_4CH_3$, $C_6H_4OCH_3$, $C_2H_4OH$, $C_3H_6OH$, $C_2H_4OCH_3$, $C_3H_6OCH_3$, $C_2H_4OC_2H_5$, $C_2H_4OC_4H_9$, $C_3H_6OC_2H_5$, $C_2H_4OC_2H_4OH$, $C_3H_6OC_2H_4OH$, $C_3H_6OC_4H_8OH$, $C_3H_8OC_2H_4OCH_3$, $C_3H_6OC_2H_5$, $C_3H_6OC_2H_4OC_4H_9$, $C_3H_6OC_4H_8OC_2H_5$, $C_3H_6OC_4H_8OC_4H_9$, $C_2H_4OC_2H_4OCO(CH_2)_mCH_3$, $C_3H_6OC_2H_4OCO(CH_2)_mCH_3$, $C_3H_6OC_4H_8OCO(CH_2)_mCH_3$, $C_2H_4OCO(CH_2)_mCH_3$, $C_3H_6OCO(CH_2)_mCH_3$, $C_3H_6OCH_2C_6H_5$ and $C_3H_6OC_2H_4OC_6H_5$, where m is from 1 to 4.

Examples of particularly preferred combinations of $B^3$ and $B^4$ are hydrogen and $C_2H_4OC_2H_4OCOCH_3$, $C_2H_4OC_2H_4OCOC_2H_5$, $C_3H_6OC_4H_8OH$, ,$C_3H_6OC_4H_8OCOCH_3$,.$C_3H_6OC_4H_8OCOC_2H_5$, $C_3H_6OC_2H_4OCH_3$, $C_3H_6OC_2H_4OC_2H_5$, $C_3H_6OC_2H_4OC_4H_9$, $C_3H_6OC_4H_8OC_2H_5$, $C_3H_6OC_4H_8OC_4H_9$, $C_3H_6OCH_2C_6H_5$, $C_3H_6OC_2H_4OC_6H_5$ or $C_3H_6OCH_2CH(C_2H_5)C_4H_9$, and $C_2H_5$, $C_2H_4OCH_3$, $C_3H_6OCH_3$, $CH(CH_3)_2$ or $C_4H_9$ in combination with $C_2H_4OC_2H_4OCOCH_3$, $C_3H_6OC_4H_8OH$, $C_3H_6OC_4H_8OCHO$, $C_3H_6OC_4H_8OCOCH_3$, $C_3H_6OC_4H_8OCOC_2H_5$, $C_3H_6OC_2H_4OC_4H_9$, $C_3H_6OC_4H_8OC_2H_5$, $C_3H_6OC_4H_8OC_4H_9$ or $C_3H_6OC_2H_4OC_6H_5$ and furthermore $C_2H_4OH$, $C_3H_6OH$, $C_2H_4OCOCH_3$, $C_2H_4OCOC_2H_5$, $C_3H_6OCOCH_3$ or $C_3H_6OCOC_2H_5$ in combination with $C_3H_6OC_2H_4OCH_3$, $C_3H_6OC_2H_4OC_2H_5$, $C_3H_6OC_2H_4OC_4H_9$, $C_3H_6OC_4H_8OC_2H_5$, $C_3H_6OC_4H_8OC_4H_9$, $C_6H_4OCH_3$ or $C_6H_5$.

The process for the preparation of acyloxyalkyl-substituted or acyloxyalkoxyalkyl-substituted 2,6-diaminopyridines which is free of by-products is also particularly important.

Previously, azo dyes containing such coupling components had to be prepared by subsequent acylation of the corresponding hydroxyl-containing dyes in anhydrous organic solvents with acyl halides or anhydrides since the coupling components themselves preferentially undergo N-acylation under these conditions, and the N-acyl-2,6-diaminopyridines are not capable of coupling.

According to the invention, the coupling components are prepared by adding not less than an equivalent amount of sulfuric acid to a solution or suspension of the hydroxyl-containing substituted pyridine in the desired organic acid and stirring the mixture at from 20° to 100° C., preferably from 20° to 50° C. The degree of acylation is dependent on the water content and reaches 100% in an anhydrous medium. However, the absence of water and 100% conversion are not essential in every case in order to achieve optimum dyeing properties. An adequate conversion in most cases is 70–70%, which does not require the absence of water and advantageously allows the acylation to be combined with the preparation of the hydroxyalkylaminopyridine.

EXAMPLE 1

4.7 parts of 2-amino-4-chloro-3-cyano-5-formylthiophene in 30 parts by volume of 85% strength sulfuric acid were stirred at no higher than 30° C., 8.3 parts of nitrosylsulfuric acid (11.5% of $N_2O_3$) were added dropwise at 0°–5° C., and the mixture was then stirred for a further 4 hours at this temperature.

The resulting diazonium salt solution was slowly run, at 0° C., into a solution of 5.8 parts of N,N-diallyl-3-aminoacetanilide in a mixture of 25 parts by volume of dimethylformamide, 125 parts of water, 300 parts of ice, 20 parts by volume of 32% strength hydrochloric acid and 0.5 part of amidosulfonic acid. When coupling was complete, the dye was filtered off under suction, washed neutral and dried to give 9 parts of the dye of the formula

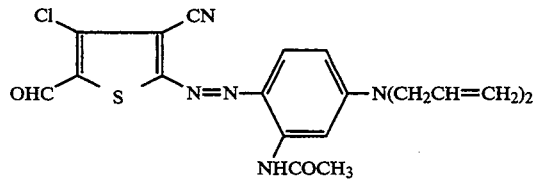

which dyes polyester fibers in fast blue hues.

EXAMPLE 2

4.7 parts of 2-amino-4-chloro-3-cyano-5-formylthiophene were diazotized by a method similar to that described in Example 1. The diazonium salt solution was added dropwise at 0° C., to a solution of 8.8 parts of o-(bisacetoxyethyl)-amino-p-acetanisidine in a mixture of 125 parts of water, 350 of ice, 1 part of 96% strength sulfuric acid and 0.5 part of amidosulfonic acid. When coupling was complete, the dye was filtered under suction, washed until neutral and dried to give 9.5 parts of a greenish black powder of the formula

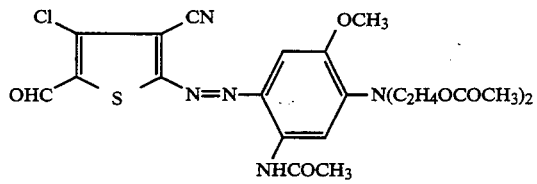

which dyes polyester fabric in fast greenish blue hues.

The dyes characterized in the Table below are obtained similarly to Examples 1 and 2.

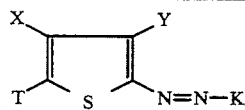

| Example No. | T | X | Y | —K | Dyeing on polyester |
|---|---|---|---|---|---|
| 3 | CHO | Cl | CN | 4-N(C₂H₅)₂, 2-CH₃, 3-NHCOCH₃ phenyl | blue |
| 4 | CHO | Cl | CN | 4-N(C₂H₅)₂ phenyl | bluish violet |
| 5 | CHO | Cl | CN | 4-N(C₂H₅)₂, 2-CH₃, 5-CH₃ phenyl | blue |
| 6 | CHO | Cl | CN | 4-N(C₂H₄OCOCH₃)₂, 2-CH₃, 3-NHCOCH₃ phenyl | blue |
| 7 | CHO | Cl | CN | 4-N(C₂H₄OCOCH₃)₂, 2-CH₃, 3-NHCOC₆H₅ phenyl | blue |
| 8 | CHO | Cl | CN | 4-N(C₂H₄CN)(CH₂CH=CH₂), 2-CH₃, 3-NHCOCH₃ phenyl | blue |
| 9 | CHO | Cl | CN | 4-N(C₂H₄CN)(CH₂CH=CH₂), 2-CH₃, 3-NHCOC₆H₅ phenyl | blue |
| 10 | CHO | Cl | CN | 4-N(C₂H₄CN)(C₂H₄OCOCH₃), 2-CH₃, 3-NHCOC₆H₅ phenyl | blue |

-continued

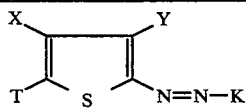

| Example No. | T | X | Y | —K | Dyeing on polyester |
|---|---|---|---|---|---|
| 11 | CHO | Cl | CN | 4-methyl-3-methyl-phenyl, N(CH₂CH=CH₂)(C₂H₄CN) | reddish blue |
| 12 | CHO | Cl | CN | 4-methyl-3-methyl-phenyl, N(C₂H₄CN)(C₂H₅) | reddish blue |
| 13 | CHO | Cl | CN | 4-methyl-phenyl, N(C₂H₄CN)(C₂H₅) | bluish violet |
| 14 | CHO | Cl | CN | 4-methyl-phenyl, N(C₂H₄CN)(C₂H₄OCOCH₃) | violet |
| 15 | CHO | Cl | CN | 4-methyl-2-OCH₃-5-NHCOCH₃-phenyl, N(C₂H₅)₂ | greenish blue |
| 16 | CHO | Cl | CN | 4-methyl-2-OCH₃-5-NHCOCH₃-phenyl, NHC₂H₄CO₂CH₃ | greenish blue |
| 17 | CHO | Cl | CN | 4-methyl-2-OCH₃-5-NHCOCH₃-phenyl, N(CH₂CH=CH₂)(C₂H₄CN) | greenish blue |
| 18 | CHO | Cl | CN | 4-methyl-2-OCH₃-5-NHCOCH₃-phenyl, N(CH₂CH=CH₂)₂ | greenish blue |
| 19 | CHO | Cl | CN | 4-methyl-2-OCH₃-5-NHCOCH₃-phenyl, N(C₂H₄OH)(C₂H₄CN) | greenish blue |

-continued

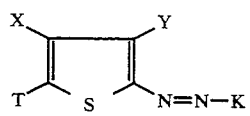

| Example No. | T | X | Y | —K | Dyeing on polyester |
|---|---|---|---|---|---|
| 20 | CHO | Cl | CN | 4-methyl-2-OCH₃-5-NHCOCH₃-phenyl-NHC₂H₄CN | greenish blue |
| 21 | CHO | Cl | CN | 4-methyl-2-OCH₃-5-OCH₃-phenyl-N(C₂H₄OCOCH₃)₂ | greenish blue |
| 22 | CHO | Cl | CN | 4-methyl-2-OCH₃-5-CH₃-phenyl-N(C₂H₄OCOCH₃)₂ | blue |
| 23 | CHO | Cl | CN | 4-methyl-3-NHCOCH₃-phenyl-N(C₄H₉)₂ | blue |
| 24 | CHO | Cl | CO₂C₂H₅ | 4-methyl-3-NHCOCH₃-phenyl-N(C₆H₁₃)₂ | blue |
| 25 | CHO | Cl | CN | 4-methyl-3-CH₃-phenyl-N(C₄H₉)₂ | blue |
| 26 | CHO | Cl | CN | 4-methyl-3-OCH₃-phenyl-N(C₂H₅)₂ | blue |
| 27 | CHO | Cl | CN | 4-methyl-3-NHSO₂CH₃-phenyl-N(C₂H₅)₂ | blue |

-continued

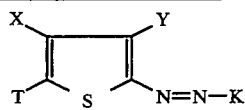

| Example No. | T | X | Y | —K | Dyeing on polyester |
|---|---|---|---|---|---|
| 28 | CHO | Cl | CN | 2,5-dimethoxy-4-methyl-phenyl with -N(C₂H₅)₂ | blue |
| 29 | CHO | Cl | CN | 3-methyl-4-methyl-phenyl with -N(C₂H₅)(C₂H₄COC₂H₄OC₂H₅=O) | blue |
| 30 | CHO | Cl | CN | 2,5-dimethyl-phenyl with -NHC₂H₄CO₂CH₃ | blue |
| 31 | CHO | Cl | COOCH₃ | 3-methyl-phenyl with -N(C₂H₅)₂ | blue |
| 32 | CHO | Cl | SO₂CH₃ | 3-NHCOCH₃-phenyl with -N(C₄H₉)₂ | blue |
| 33 | CHO | Cl | CONH₂ | 3-methyl-phenyl with -N(C₂H₄CN)(C₂H₅) | reddish blue |
| 34 | CHO | Cl | CON(CH₃)₂ | 3-NHCOCH₃-phenyl with -N(C₂H₄OCOCH₃)₂ | blue |
| 35 | CHO | Cl | CO₂C₂H₅ | 3-NHCOCH₃-phenyl with -N(C₂H₅)₂ | blue |
| 36 | CHO | Cl | CO₂C₂H₅ | phenyl with -N(C₂H₅)₂ | bluish violet |

-continued

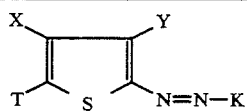

| Example No. | T | X | Y | —K | Dyeing on polyester |
|---|---|---|---|---|---|
| 37 | CHO | Cl | $CO_2C_2H_5$ | 4-$N(C_4H_9)_2$-3-$CH_3$-phenyl | blue |
| 38 | CHO | Cl | $CO_2C_2H_5$ | 2-$OCH_3$-5-$NHCOCH_3$-4-N($C_2H_4CN$)($CH_2CH=CH_2$)-phenyl | greenish blue |
| 39 | CHO | Br | CN | 4-N($C_2H_4CN$)($C_2H_5$)-phenyl | violet |
| 40 | CHO | Br | CN | 4-N($C_2H_4CN$)($C_2H_5$)-3-$CH_3$-phenyl | bluish violet |
| 41 | CHO | Br | CN | 4-$N(C_2H_5)_2$-3-$NHCOCH_3$-phenyl | blue |
| 42 | CHO | Br | CN | 2-$OCH_3$-5-$NHCOCH_3$-4-$N(C_2H_4OCOCH_3)_2$-phenyl | greenish blue |
| 43 | CHO | Br | $CO_2C_2H_5$ | 4-$N(CH_2CH=CH_2)_2$-3-$NHCOCH_3$-phenyl | blue |
| 44 | CHO | F | CN | 4-$N(C_2H_5)_2$-3-$NHCOCH_3$-phenyl | blue |
| 45 | CHO | F | CN | 4-$N(C_2H_5)_2$-phenyl | reddish blue |

-continued

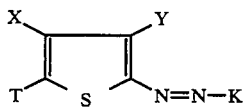

| Example No. | T | X | Y | —K | Dyeing on polyester |
|---|---|---|---|---|---|
| 46 | CHO | F | CN | 4-N(CH$_2$CH=CH$_2$)$_2$-3-CH$_3$-phenyl | blue |
| 47 | CHO | F | CO$_2$C$_2$H$_5$ | 4-N(CH$_2$CH=CH$_2$)(C$_2$H$_4$CN)-phenyl | reddish blue |
| 48 | CHO | Cl | CO$_2$C$_2$H$_5$ | 4-N(C$_2$H$_5$)$_2$-3-NHCOCH$_3$-phenyl | blue |
| 49 | CHO | Cl | CONH$_2$ | 4-N(C$_2$H$_5$)$_2$-3-CH$_3$-phenyl | blue |
| 50 | CHO | Cl | NO$_2$ | 4-N(C$_2$H$_4$CN)(C$_2$H$_5$)-3-NHCOCH$_3$-phenyl | blue |
| 51 | CHO | Cl | CON(CH$_3$)$_2$ | 4-N(C$_2$H$_5$)$_2$-3-CH$_3$-phenyl | blue |
| 52 | CHO | Cl | SO$_2$CH$_3$ | 4-N(C$_2$H$_4$CN)(C$_2$H$_5$)-3-CH$_3$-phenyl | blue |
| 53 | CHO | Br | CO$_2$C$_2$H$_5$ | 4-N(C$_2$H$_4$CN)(C$_2$H$_5$)-3-CH$_3$-phenyl | blue |
| 54 | CHO | Cl | CN | 4-phenyl-5-methyl-2-(N(C$_2$H$_5$)$_2$)-thiazole | blue |

-continued

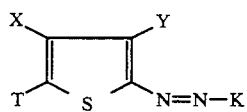

| Example No. | T | X | Y | —K | Dyeing on polyester |
|---|---|---|---|---|---|
| 55 | CHO | Cl | CN | 4-CH₃-C₆H₄ group attached to thiazole with S, N=, N(C₂H₅)₂ | blue |
| 56 | CHO | Br | CN | phenyl group attached to thiazole with S, N=, N(C₄H₉)₂ | blue |
| 57 | CHO | Cl | CN | pyridine with H₃C, CN, NHC₃H₆OC₄H₈OH, NHC₂H₄OCH₃ | violet |
| 58 | CHO | Cl | CN | 4-methyl-1-(NHC₂H₅)-naphthalene | blue |
| 59 | CHO | Cl | CO₂C₂H₅ | 4-methyl-1-(NHC₂H₄OH)-naphthalene | blue |
| 60 | CHO | Cl | CN | 3-methyl-5-hydroxy-1-phenylpyrazole | yellowish brown |
| 61 | CHO | Cl | CN | 5-amino-4-methyl-1-benzylpyrazole | red |

-continued
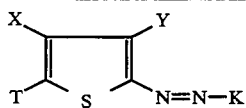
| Example No. | T | X | Y | —K | Dyeing on polyester |
|---|---|---|---|---|---|
| 62 | CHO | Cl | CN | (2-methylphenyl)-C(CH₃)=C(phenyl)-N—CH₃ | red |
| 63 | CHO | Cl | CN | 1,2,2,4-tetramethyl-1,2,3,4-tetrahydroquinolin-6-yl | blue |
| 64 | CHO | Cl | CN | 4-phenyl-3-cyano-2-morpholinothien-5-yl | blue |
| 65 | CHO | Br | CN | 4-phenyl-3-cyano-2-pyrrolidinothien-5-yl | blue |
| 66 | CHO | Cl | CN | 4-phenyl-3-cyano-2-N(C₄H₉)₂-thien-5-yl | blue |
| 67 | CHO | Cl | CN | 4-morpholinophenyl | violet |
| 68 | CHO | Cl | CN | 2,4-dihydroxyphenyl | red |

-continued

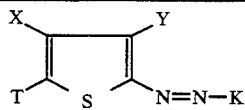

| Example No. | T | X | Y | —K | Dyeing on polyester |
|---|---|---|---|---|---|
| 69 | CHO | Cl | CN | 1-methyl-2-hydroxynaphthalene | red |
| 70 | CHO | Cl | CN | 4-methylphenyl-N=N-CH=CH-CH(C6H5)- (pyrazoline) | blue |
| 71 | CHO | Cl | CN | 4-methylphenyl-N=N-C(CH3)=CH-C(CH3)2- | blue |
| 72 | H | Cl | CN | 4-methyl-3-methyl-N(C2H5)(C2H4CN)-phenyl | red |
| 73 | CH3 | Cl | CN | 4-methyl-3-NHCOCH3-N(C2H5)2-phenyl | red |
| 74 | CH3 | Cl | CN | 4-methyl-3-methyl-N(C2H5)2-phenyl | red |
| 75 | CH3 | Cl | CN | 4-methyl-2-OCH3-5-NHCOCH3-N(CH2CH2OCOCH3)2-phenyl | reddish violet |
| 76 | C2H5 | Cl | CN | 4-methyl-3-methyl-N(C2H5)(C2H4CN)-phenyl | red |
| 77 | CH3 | Br | CN | 4-methyl-3-methyl-N(C2H5)(C2H4CN)-phenyl | red |

-continued

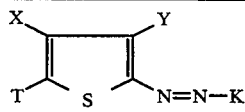

| Example No. | T | X | Y | —K | Dyeing on polyester |
|---|---|---|---|---|---|
| 78 | CN | Cl | CN | 4-N(C₂H₅)₂, 3-CH₃ phenyl | blue |
| 79 | CN | Cl | CN | 4-N(C₂H₄OCOCH₃)₂, 3-NHCOCH₃ phenyl | blue |
| 80 | CN | Cl | CN | 4-N(C₂H₄OCOCH₃)₂, 3-NHCOCH₃, 6-OCH₃ phenyl | greenish blue |
| 81 | CN | Br | CN | 4-N(CH₂CH=CH₂)₂ phenyl | reddish blue |
| 82 | CN | Cl | CN | 4-phenyl-5-methyl-2-(N(C₂H₅)₂) thiazole | blue |
| 83 | NO₂ | Cl | CN | 4-N(C₂H₅)₂ phenyl | reddish blue |
| 84 | NO₂ | Cl | CN | 4-N(C₂H₅)₂, 3-CH₃ phenyl | blue |
| 85 | NO₂ | Cl | CN | 4-N(C₂H₅)₂, 3-NHCOCH₃ phenyl | greenish blue |
| 86 | NO₂ | Cl | CN | 4-N(C₂H₄OCOCH₃)₂, 3-OCH₃, 6-OCH₃ phenyl | greenish blue |

-continued

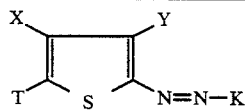

| Example No. | T | X | Y | —K | Dyeing on polyester |
|---|---|---|---|---|---|
| 87 | CH$_3$C(=O)— | Cl | CN | [phenyl with N(C$_2$H$_5$)$_2$ and NHCOCH$_3$] | blue |
| 88 | NO$_2$ | Br | CN | [phenyl with N(C$_2$H$_5$)$_2$ and CH$_3$] | blue |
| 89 | NO$_2$ | Cl | CN | [phenyl/thiazole with N(C$_2$H$_5$)$_2$] | greenish blue |
| 90 | NO$_2$ | Cl | CN | [thienyl/thiazole with N(C$_2$H$_5$)$_2$] | greenish blue |
| 91 | Br | Cl | CN | [phenyl with N(C$_2$H$_5$)(C$_2$H$_4$CN), CH$_3$] | bluish red |
| 92 | Br | Cl | CN | [phenyl with 2,5-diOCH$_3$, N(C$_2$H$_4$OCOCH$_3$)$_2$] | bluish violet |
| 93 | Br | Cl | CN | [phenyl with N(C$_2$H$_5$)$_2$] | red |
| 94 | Br | Cl | CN | [phenyl with N(C$_2$H$_4$CN)(C$_2$H$_5$)] | red |
| 95 | Br | Cl | CN | [phenyl-thiophene with CN and N(C$_2$H$_5$)$_2$] | bluish violet |

-continued

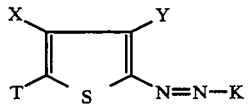

| Example No. | T | X | Y | —K | Dyeing on polyester |
|---|---|---|---|---|---|
| 96 | Cl | Cl | CN | ![phenyl with N(C2H5)(C2H4CN), CH3] | bluish red |
| 97 | Cl | Cl | CN | ![phenyl with N(C2H4OCOCH3)2, NHCOCH3] | reddish blue |
| 98 | Br | Br | CN | ![phenyl with N(C2H5)2, NHCOCH3] | reddish blue |

EXAMPLE 99

11.7 parts of 2-amino-3-cyano-4-ethoxy-5-formylthiophene in 200 parts by volume of a 3:1 glacial acetic acid/propionic acid mixture and 25 parts by volume of 96% strength sulfuric acid were stirred at no higher than 20° C. 23 parts of nitrosylsulfuric acid (11.5% of $N_2O_3$) were added dropwise at 0°–5° C., and the mixture was then stirred for 1 hour.

The resulting diazonium salt solution was added dropwise, at 0° C., to a solution of 21 parts of o-(bisacetoxyethyl)-amino-p-acetanisidine in a mixture of 100 parts by volume of dimethylformamide, 500 parts of water, 25 parts by volume of 18% strength hydrochloric acid, 250 parts of ice and 1 part of amidosulfonic acid. When coupling was complete, the dye was filtered off under suction, washed neutral and dried to give 25 parts of the dye of the formula

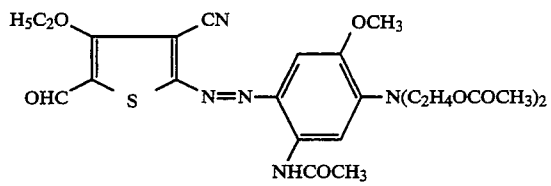

which dyes polyester fibers in fast greenish blue hues.

The dyes shown in the Table below were obtained similarly to Example 99.

| Example No. | T | X | Y | —K | Dyeing on polyester |
|---|---|---|---|---|---|
| 100 | CHO | $OC_2H_5$ | CN | ![phenyl with N(C2H5)2, NHCOCH3] | blue |
| 101 | CHO | $OC_2H_5$ | CN | ![phenyl with N(C2H5)2] | bluish violet |
| 102 | CHO | $OC_2H_5$ | CN | ![phenyl with N(C2H5)2, CH3] | blue |

-continued

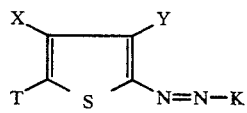

| Example No. | T | X | Y | —K | Dyeing on polyester |
|---|---|---|---|---|---|
| 103 | CHO | OC$_2$H$_5$ | CN | 4-N(C$_2$H$_4$OCOCH$_3$)$_2$-3-NHCOCH$_3$-phenyl | blue |
| 104 | CHO | OC$_2$H$_5$ | CN | 4-N(C$_2$H$_4$CN)(CH$_2$CH=CH$_2$)-3-HNCOCH$_3$-phenyl | blue |
| 105 | CHO | OC$_2$H$_5$ | CN | 4-N(C$_2$H$_4$CN)(C$_2$H$_4$OCOCH$_3$)-3-HNCOC$_6$H$_5$-phenyl | blue |
| 106 | CHO | OC$_2$H$_5$ | CN | 4-N(CH$_2$CH=CH$_2$)(C$_2$H$_4$CN)-3-CH$_3$-phenyl | reddish blue |
| 107 | CHO | OC$_2$H$_5$ | CN | 4-N(C$_2$H$_4$CN)(C$_2$H$_5$)-3-CH$_3$-phenyl | reddish blue |
| 108 | CHO | OC$_2$H$_5$ | CN | 4-N(C$_2$H$_4$CN)(C$_2$H$_5$)-phenyl | bluish violet |
| 109 | CHO | OC$_2$H$_5$ | CN | 4-N(C$_2$H$_4$CN)(C$_2$H$_4$OCOCH$_3$)-phenyl | violet |
| 110 | CHO | OC$_2$H$_5$ | CN | 4-OCH$_3$-3-N(C$_2$H$_5$)$_2$-5-NHCOCH$_3$-phenyl | greenish blue |
| 111 | CHO | OC$_2$H$_5$ | CN | 4-OCH$_3$-3-NHC$_2$H$_4$CO$_2$CH$_3$-5-NHCOCH$_3$-phenyl | greenish blue |

-continued

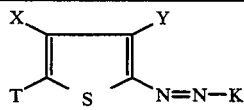

| Example No. | T | X | Y | —K | Dyeing on polyester |
|---|---|---|---|---|---|
| 112 | CHO | OC$_2$H$_5$ | CN | 4-OCH$_3$, 2-N(CH$_2$CH=CH$_2$)$_2$, 5-NHCOCH$_3$ phenyl | greenish blue |
| 113 | CHO | OC$_2$H$_5$ | CN | 2-OCH$_3$, 4-N(C$_2$H$_4$OCOCH$_3$)$_2$, 5-OCH$_3$ phenyl | greenish blue |
| 114 | CHO | OC$_2$H$_5$ | CN | 2-OCH$_3$, 4-N(C$_2$H$_4$OCOCH$_3$)$_2$, 5-CH$_3$ phenyl | blue |
| 115 | CHO | OC$_2$H$_5$ | CO$_2$C$_2$H$_5$ | 4-N(C$_6$H$_{13}$)$_2$, 2-NHCOCH$_3$ phenyl | blue |
| 116 | CHO | OC$_2$H$_5$ | COOCH$_3$ | 4-N(C$_2$H$_5$)$_2$, 2-CH$_3$ phenyl | blue |
| 117 | CHO | OC$_2$H$_5$ | SO$_2$CH$_3$ | 4-N(C$_4$H$_9$)$_2$, 2-NHCOCH$_3$ phenyl | blue |
| 118 | CHO | OC$_2$H$_5$ | CONH$_2$ | 4-N(C$_2$H$_4$CN)(C$_2$H$_5$), 2-CH$_3$ phenyl | reddish blue |
| 119 | CHO | OC$_2$H$_5$ | CON(CH$_3$)$_2$ | 4-N(C$_2$H$_4$OCOCH$_3$)$_2$, 2-NHCOCH$_3$ phenyl | blue |
| 120 | CHO | OC$_2$H$_5$ | CO$_2$C$_2$H$_5$ | 4-N(C$_2$H$_5$)$_2$, 2-NHCOCH$_3$ phenyl | blue |

-continued

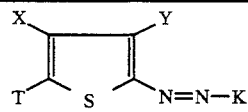

| Example No. | T | X | Y | —K | Dyeing on polyester |
|---|---|---|---|---|---|
| 121 | CHO | OC₂H₅ | CO₂C₂H₅ | —⟨C₆H₄⟩—N(C₂H₅)₂ | bluish violet |
| 122 | CHO | OC₂H₅ | CO₂C₂H₅ | —⟨C₆H₃(CH₃)⟩—N(C₄H₉)₂ | blue |
| 123 | CHO | OC₂H₅ | CO₂C₂H₅ | —⟨C₆H₂(OCH₃)(NHCOCH₃)⟩—N(C₂H₄CN)(CH₂CH=CH₂) | greenish blue |
| 124 | CHO | OCH₃ | CN | —⟨C₆H₄⟩—N(C₂H₄CN)(C₂H₅) | violet |
| 125 | CHO | OCH₃ | CN | —⟨C₆H₃(CH₃)⟩—N(C₂H₄CN)(C₂H₅) | bluish violet |
| 126 | CHO | OCH₃ | CN | —⟨C₆H₃(NHCOCH₃)⟩—N(C₂H₅)₂ | blue |
| 127 | CHO | OCH₃ | CN | —⟨C₆H₂(OCH₃)(NHCOCH₃)⟩—N(C₂H₄OCOCH₃)₂ | greenish blue |
| 128 | CHO | OCH₃ | CO₂C₂H₅ | —⟨C₆H₃(NHCOCH₃)⟩—N(CH₂CH=CH₂)₂ | blue |
| 129 | CHO | OC₆H₅ | CN | —⟨C₆H₃(NHCOCH₃)⟩—N(C₂H₅)₂ | blue |
| 130 | CHO | OC₆H₅ | CN | —⟨C₆H₄⟩—N(CH₂CH=CH₂)(C₂H₄CN) | bluish violet |

-continued

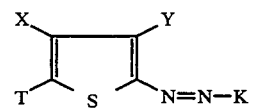

| Example No. | T | X | Y | —K | Dyeing on polyester |
|---|---|---|---|---|---|
| 131 | CHO | SC$_6$H$_5$ | CO$_2$C$_2$H$_5$ | 4-methyl-3-NHCOCH$_3$-phenyl-N(C$_2$H$_5$)$_2$ | blue |
| 132 | CHO | SC$_2$H$_5$ | CN | 4-[N(C$_2$H$_4$CN)(C$_2$H$_5$)]phenyl | bluish violet |
| 133 | CHO | SC$_6$H$_5$ | CN | 4-methyl-3-CH$_3$-phenyl-N(C$_2$H$_4$CN)(C$_2$H$_5$) | blue |
| 134 | CHO | OC$_2$H$_5$ | CN | 4-phenyl-5-methyl-2-N(C$_2$H$_5$)$_2$-thiazole | blue |
| 135 | CHO | OC$_2$H$_5$ | CN | 4-(4-tolyl)-5-methyl-2-N(C$_2$H$_5$)$_2$-thiazole | blue |
| 136 | CHO | OC$_2$H$_5$ | CN | 4-phenyl-5-methyl-2-N(C$_4$H$_9$)$_2$-thiazole | blue |
| 137 | CHO | OC$_2$H$_5$ | CN | 4-CH$_3$, 3-CN, 2-NHC$_3$H$_6$OC$_4$H$_8$OH, 6-NHC$_2$H$_4$OCH$_3$-pyridine | reddish blue |
| 138 | CHO | OC$_2$H$_5$ | CN | 4-methyl-1-NHC$_2$H$_5$-naphthyl | blue |

-continued
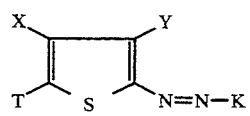
| Example No. | T | X | Y | —K | Dyeing on polyester |
|---|---|---|---|---|---|
| 139 | CHO | OCH₃ | CO₂C₂H₅ | 4-methyl-1-(NHC₂H₄OH)-naphthyl | blue |
| 140 | CHO | OC₂H₅ | CN | 3-methyl-5-hydroxy-1-phenyl-pyrazolyl | yellowish brown |
| 141 | CHO | OC₂H₅ | CN | 5-amino-4-methyl-1-benzyl-pyrazolyl | red |
| 142 | CHO | OC₂H₅ | CN | C(CH₃)=C(Ph)–N(CH₃)(o-tolyl) | red |
| 143 | CHO | OC₂H₅ | CN | 1,2,2,4-tetramethyl-1,2,3,4-tetrahydroquinolin-6-yl | blue |
| 144 | CHO | OC₂H₅ | CN | 3-cyano-4-phenyl-2-morpholino-thien-5-yl | blue |

-continued

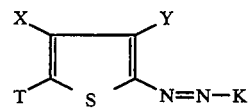

| Example No. | T | X | Y | —K | Dyeing on polyester |
|---|---|---|---|---|---|
| 145 | CHO | $OCH_3$ | CN | phenyl-thiophene with CN and pyrrolidinyl substituents | blue |
| 146 | CHO | $OC_6H_5$ | CN | phenyl-thiophene with CN and $N(C_4H_9)_2$ substituents | blue |
| 147 | $CH_3$ | $OC_2H_5$ | CN | methyl-phenyl with $N(C_2H_5)_2$ and $NHCOCH_3$ | red |
| 148 | $CH_3$ | $OC_2H_5$ | CN | methyl-phenyl with $N(C_2H_5)_2$ and $CH_3$ | red |
| 149 | $CH_3$ | $OC_2H_5$ | CN | phenyl with $OCH_3$, $N(CH_2CH_2OCOCH_3)_2$, $NHCOCH_3$ | reddish violet |
| 150 | $C_2H_5$ | $OC_2H_5$ | CN | methyl-phenyl with $N(C_2H_5)(C_2H_4CN)$ and $CH_3$ | red |
| 151 | $CH_3$ | $OC_2H_5$ | CN | phenyl with $N(C_2H_5)(C_2H_4CN)$ and $CH_3$ | red |
| 152 | CN | $OC_2H_5$ | CN | methyl-phenyl with $N(C_2H_5)$ and $CH_3$ | blue |

-continued

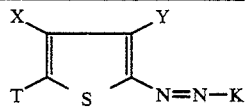

| Example No. | T | X | Y | —K | Dyeing on polyester |
|---|---|---|---|---|---|
| 153 | CN | OC$_2$H$_5$ | CN | 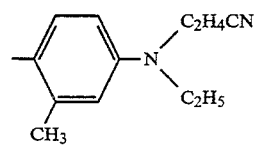 | blue |
| 154 | NO$_2$ | OC$_2$H$_5$ | CN | 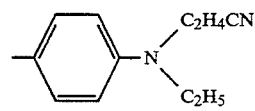 | blue |

EXAMPLE 155

5.8 parts of the dye described in Example 12 were dissolved in 60 parts by volume of dioxane, 3.4 parts of ethyl cyanoacetate, 1 part of glacial acetic acid and 1 part of piperidine were added, and the mixture was stirred for 16 hours at room temperature, after which 50 parts of water and 50 parts of ice were added. Stirring was continued for 15 minutes, and the product was filtered off under suction, washed neutral and dried at 50° C. under reduced pressure to give 6.6 parts of the dye of the formula

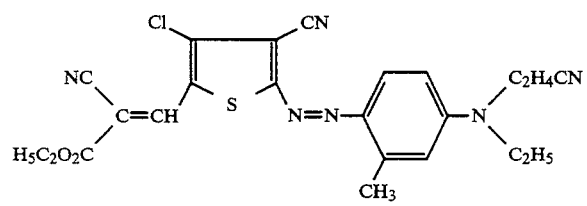

which dyes polyester fibers in medium blue hues.

EXAMPLE 156

5.1 parts of the dye described in Example 13 were dissolved in 65 parts by volume of dioxane, 4.2 parts of butyl cyanoacetate, 1 part of glacial acetic acid and 1 part of piperidine were added and the mixture was stirred for 16 hours at room temperature. Thereafter, 50 parts of water and 50 parts of ice were added, stirring was continued for 1 hour and the product was filtered off under suction, washed neutral and dried to give 5.9 parts of the dye of the formula

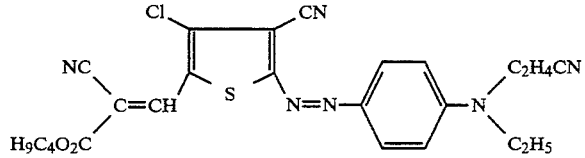

which dyes polyester in fast blue hues.

The dyes listed in the Table below were obtained similarly to Examples 155 and 156.

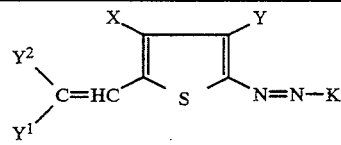

| Example No. | X | Y | Y$^1$ | Y$^2$ | —K | Dyeing on polyester |
|---|---|---|---|---|---|---|
| 157 | Cl | CN | COOC$_2$H$_5$ | COOC$_2$H$_5$ | ![](aryl with N(C$_2$H$_4$CN)(C$_2$H$_5$), CH$_3$) | blue |
| 158 | Cl | CN | COOC$_2$H$_5$ | COOC$_2$H$_5$ | ![](aryl with N(C$_2$H$_4$CN)(C$_2$H$_5$)) | reddish blue |

-continued

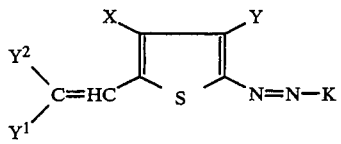

| Example No. | X | Y | Y¹ | Y² | —K | Dyeing on polyester |
|---|---|---|---|---|---|---|
| 159 | Cl | CN | COOC$_2$H$_5$ | COOC$_2$H$_5$ | 4-methyl-2-methoxy-phenyl-N(C$_2$H$_5$)$_2$ | blue |
| 160 | Cl | CN | COOC$_2$H$_5$ | COOC$_2$H$_5$ | 4-methyl-2-(NHCOCH$_3$)-phenyl-N(C$_4$H$_9$)$_2$ | blue |
| 161 | Cl | CN | CN | CN | 4-methyl-3-methyl-phenyl-N(C$_2$H$_5$)(C$_2$H$_4$CN) | blue |
| 162 | Cl | CN | COCH$_3$ | COOC$_2$H$_5$ | 4-methyl-3-methyl-phenyl-N(C$_2$H$_5$)(C$_2$H$_4$CN) | blue |
| 163 | Cl | COOC$_2$H$_5$ | CN | COOC$_2$H$_5$ | 4-methyl-phenyl-N(C$_2$H$_5$)$_2$ | blue |
| 164 | Cl | COOC$_2$H$_5$ | CN | COOC$_2$H$_5$ | 4-methyl-3-methyl-phenyl-N(C$_2$H$_4$OCOCH$_3$)$_2$ | blue |
| 165 | Cl | COOC$_2$H$_5$ | CN | COOC$_2$H$_5$ | 4-methyl-2-(NHCOCH$_3$)-phenyl-N(C$_2$H$_5$)$_2$ | blue |
| 166 | Cl | COOC$_2$H$_5$ | COOC$_2$H$_5$ | COOC$_2$H$_5$ | 4-methyl-3-methyl-phenyl-N(C$_2$H$_5$)(C$_2$H$_4$CN) | dark blue |
| 167 | Cl | COOC$_2$H$_5$ | COCH$_3$ | COOC$_2$H$_5$ | 4-methyl-3-methyl-phenyl-N(C$_2$H$_5$)(C$_2$H$_4$CN) | dark blue |

-continued

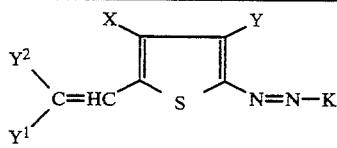

| Example No. | X | Y | Y¹ | Y² | —K | Dyeing on polyester |
|---|---|---|---|---|---|---|
| 168 | Cl | COOC₂H₅ | COCH₃ | COCH₃ | 4-methyl-3-methyl-phenyl-N(C₂H₅)(C₂H₄CN) | blue |
| 169 | Cl | COOC₂H₅ | COCH₃ | CN | 4-methyl-3-methyl-phenyl-N(C₂H₅)(C₂H₄CN) | dark blue |
| 170 | Cl | CONH₂ | CN | COOC₂H₅ | 4-methyl-3-methyl-phenyl-N(C₂H₄CN)(CH₂CH=CH₂) | dark blue |
| 171 | Cl | CONH₂ | CN | COOC₂H₅ | 4-methyl-3-NHCOCH₃-phenyl-N(C₂H₅)₂ | blue |
| 172 | Cl | SO₂CH₃ | CN | COOC₂H₅ | 4-methyl-3-methyl-phenyl-N(C₂H₅)(C₂H₄CN) | dark blue |
| 173 | Cl | SO₂CH₃ | CN | COOC₂H₅ | 4-methyl-3-methyl-phenyl-N(CH₂CH=CH₂)₂ | blue |
| 174 | Cl | SO₂CH₃ | CN | COOC₂H₅ | 4-methyl-3-NHCOCH₃-phenyl-N(C₂H₅)₂ | blue |
| 175 | Cl | CN | CN | COOC₂H₅ | 4-methyl-phenyl-N(C₂H₄OCOCH₃)₂ | reddish blue |
| 176 | Cl | CN | CN | COOC₂H₅ | 4-methyl-3-methyl-phenyl-N(C₂H₄CN)(CH₂CH=CHCl) | dark blue |

-continued

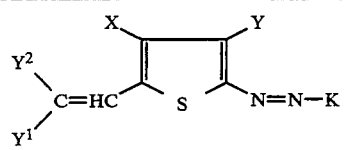

| Example No. | X | Y | Y¹ | Y² | —K | Dyeing on polyester |
|---|---|---|---|---|---|---|
| 177 | Cl | CN | CN | COOC$_2$H$_5$ | 4-methyl-3-methyl-phenyl-N(C$_2$H$_5$)(C$_2$H$_4$OCOCH$_3$) | dark blue |
| 178 | Cl | CN | CN | COOC$_2$H$_5$ | 4-methyl-3-methyl-phenyl-N(C$_2$H$_5$)(C$_2$H$_4$COOCH$_3$) | dark blue |
| 179 | Cl | CN | CN | COOC$_2$H$_5$ | 4-methyl-3-methyl-phenyl-N(C$_2$H$_5$)$_2$ | dark blue |
| 180 | Cl | CN | CN | COOC$_2$H$_5$ | 4-methyl-3-methyl-phenyl-N(C$_4$H$_9$)$_2$ | dark blue |
| 181 | Cl | CN | CN | COOC$_2$H$_5$ | 4-methyl-3-NHCOCH$_3$-phenyl-N(C$_2$H$_5$)$_2$ | blue |
| 182 | Cl | CN | CN | COOC$_2$H$_5$ | 4-phenyl-5-methyl-thiazol-2-yl-N(C$_2$H$_5$)$_2$ | blue |
| 183 | Cl | CN | CN | COOC$_2$H$_5$ | pyridine with H$_3$C, CN, NHC$_3$H$_6$OC$_4$H$_8$OH, NHC$_3$H$_6$OCH$_3$ substituents | blue |
| 184 | Cl | CN | CN | COOC$_2$H$_5$ | 4-methyl-3-NHSO$_2$CH$_3$-phenyl-N(C$_2$H$_5$)$_2$ | blue |

-continued

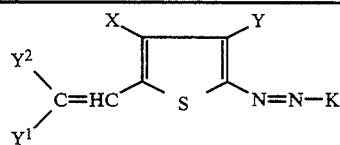

| Example No. | X | Y | Y¹ | Y² | —K | Dyeing on polyester |
|---|---|---|---|---|---|---|
| 185 | Cl | CN | CN | COOC$_2$H$_5$ | 3-methyl-1-phenyl-5-hydroxypyrazole | violet |
| 186 | Cl | CN | CN | COOC$_2$H$_5$ | 5-amino-4-methyl-1-benzylpyrazole | violet |
| 187 | Cl | CN | CN | COOC$_2$H$_5$ | 2-(N-methyl-α-phenylvinyl)phenyl | violet |
| 188 | Cl | CN | CN | CONHCH$_3$ | N-(2-cyanoethyl)-N-allyl-3-methyl-4-aminotoluene | dark blue |
| 189 | Cl | CN | CN | CONHC$_2$H$_5$ | N-(2-cyanoethyl)-N-allyl-3-methyl-4-aminotoluene | dark blue |
| 190 | Cl | CN | CN | SO$_2$CH$_3$ | N-(2-cyanoethyl)-N-allyl-3-methyl-4-aminotoluene | dark blue |
| 191 | Cl | CN | CN | COCH$_3$ | N-(2-cyanoethyl)-N-allyl-3-methyl-4-aminotoluene | dark blue |
| 192 | Cl | CN | CN | COOCH$_3$ | N-(2-cyanoethyl)-N-allyl-3-methyl-4-aminotoluene | dark blue |

-continued

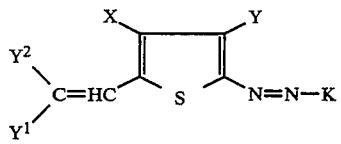

| Example No. | X | Y | Y¹ | Y² | —K | Dyeing on polyester |
|---|---|---|---|---|---|---|
| 193 | Cl | CN | CN | COOC$_4$H$_9$(n) | 4-methyl-2-(NHCOCH$_3$)-5-N(C$_4$H$_9$)$_2$ phenyl | blue |
| 194 | Cl | CN | CN | COOC$_4$H$_9$(n) | 4-methyl-2-(NHCOCH$_3$)-5-N(C$_2$H$_5$)$_2$ phenyl | blue |
| 195 | Cl | CN | CN | COOC$_4$H$_9$(n) | 4-methyl-3-CH$_3$-phenyl-NHC$_2$H$_4$OCOC$_4$H$_9$ | blue |
| 196 | Cl | CN | CN | COOC$_4$H$_9$(n) | 4-methyl-3-CH$_3$-phenyl-N(C$_2$H$_5$)(C$_2$H$_4$COC$_2$H$_4$OC$_2$H$_5$) | dark blue |
| 197 | Cl | CN | CN | CO—NH—phenyl | | 4-methyl-3-CH$_3$-phenyl-N(C$_2$H$_5$)(C$_2$H$_4$CN) | dark blue |
| 198 | Cl | CN | CN | phenyl | 4-methyl-3-CH$_3$-phenyl-N(C$_2$H$_5$)(C$_2$H$_4$CN) | dark blue |
| 199 | Cl | CN | CN | benzimidazol-2-yl | 4-methyl-3-CH$_3$-phenyl-N(C$_2$H$_5$)(C$_2$H$_4$CN) | dark blue |
| 200 | Cl | CN | CN | CONH$_2$ | 4-methyl-3-CH$_3$-phenyl-N(C$_2$H$_5$)(C$_2$H$_4$CN) | dark blue |
| 201 | Cl | CN | COOC$_2$H$_5$ | COOC$_2$H$_5$ | 4-methyl-phenyl-N(C$_4$H$_9$)$_2$ | navy blue |

-continued

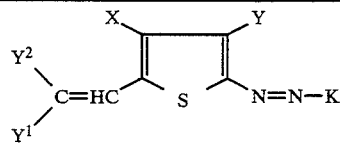

| Example No. | X | Y | Y¹ | Y² | —K | Dyeing on polyester |
|---|---|---|---|---|---|---|
| 202 | Cl | CN | COCH₃ | COOC₂H₅ | 3-methyl-4-[N(CH₂CH=CH₂)(C₂H₄OH)]phenyl | dark blue |
| 203 | Cl | CN | CN | CONHCH₃ | 3-methyl-4-[N(CH₂CH=CH₂)(C₂H₄OH)]phenyl | dark blue |
| 204 | Br | CN | CN | COOC₂H₅ | 4-[N(C₂H₅)(C₂H₄OCOCH₃)]phenyl | reddish blue |
| 205 | Br | CN | CN | COOC₂H₅ | 4-[N(C₂H₅)(C₂H₄CN)]phenyl | reddish blue |
| 206 | Br | CN | CN | COOC₂H₅ | 4-[N(C₂H₅)(C₂H₄OCH₃)]phenyl | blue |
| 207 | Br | CN | CN | COOC₂H₅ | 3-methyl-4-N(C₂H₅)₂-phenyl | dark blue |
| 208 | Br | CN | CN | COOC₂H₅ | 3-methyl-4-[N(C₂H₄CN)(CH₂CH=CH₂)]phenyl | dark blue |
| 209 | Br | CN | CN | COOC₂H₅ | 3-methyl-4-[N(C₂H₄OCH₃)(C₂H₄CN)]phenyl | dark blue |
| 210 | Br | CN | CN | COOC₂H₅ | 3-methyl-4-[N(C₂H₄OCOCH₃)₂]phenyl | dark blue |
| 211 | Br | CN | CN | COOC₂H₅ | 3-methyl-4-[N(C₂H₄CN)(C₂H₄OCNHC₄H₉)]phenyl | dark blue |

-continued

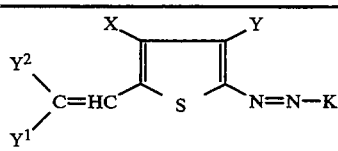

| Example No. | X | Y | Y¹ | Y² | —K | Dyeing on polyester |
|---|---|---|---|---|---|---|
| 212 | Br | CN | CN | COOC₂H₅ | 2,5-dimethyl-4-(NHC₂H₄COOCH₃)phenyl | dark blue |
| 213 | Br | CN | CN | COOC₄H₉(n) | 3-methyl-4-[N(C₂H₅)(C₂H₄OCOC₂H₅)]phenyl | dark blue |
| 214 | Br | COOC₂H₅ | CN | CN | 4-methyl-3-NHCOCH₃-phenyl-N(C₂H₅)₂ | blue |
| 215 | Br | COOC₂H₅ | CN | COOC₂H₉ | 3-methyl-4-N(C₂H₄OC₂H₅)₂-phenyl | dark blue |
| 216 | Br | COOC₂H₅ | CN | CON(CH₃)₂ | 4-N(C₂H₄OCOCH₃)₂-phenyl | bluish violet |
| 217 | Br | CONH₂ | CN | COOC₂H₅ | 3-methyl-4-N(C₂H₄CN)(C₂H₅)-phenyl | dark blue |
| 218 | Br | SO₂CH₃ | CN | COOC₂H₅ | 3-methyl-4-N(C₂H₄CN)(C₂H₅)-phenyl | dark blue |
| 219 | Br | CON(CH₃)₂ | CN | COOC₂H₅ | 3-methyl-4-N(C₂H₄CN)(C₂H₅)-phenyl | dark blue |
| 220 | Br | CN | CN | COOC₂H₅ | 4,6-dimethyl-5-CN-2-NHC₂H₄OCH₃-pyridyl with NHC₂H₄OC₂H₄OCOCH₃ | dark blue |

-continued

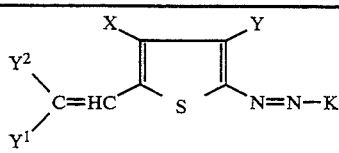

| Example No. | X | Y | Y$^1$ | Y$^2$ | —K | Dyeing on polyester |
|---|---|---|---|---|---|---|
| 221 | Br | CN | CN | COOC$_2$H$_5$ | 4-methoxyphenyl-5-methyl-2-(diethylamino)imidazole | blue |
| 222 | Br | CN | CN | COOCH$_3$ | 2-thienyl-5-methyl-2-(diethylamino)imidazole | blue |
| 223 | Br | CN | CN | COOCH$_3$ | 4-methyl-1-(NHC$_2$H$_4$OH)naphthyl | navy blue |
| 224 | Cl | CN | CN | phenyl | 3-methyl-4-[N(C$_2$H$_4$CN)(CH$_2$CH=CH$_2$)]phenyl | dark blue |
| 225 | F | CN | CN | COOC$_2$H$_5$ | 4-[N(C$_2$H$_5$)$_2$]phenyl | dark blue |
| 226 | F | CN | CN | COOC$_2$H$_5$ | 4-[N(CH$_2$CH=CH$_2$)$_2$]phenyl | dark blue |
| 227 | F | CN | CN | COOC$_2$H$_5$ | 4-[N(CH$_2$CH=CH$_2$)(C$_2$H$_4$CN)]phenyl | dark blue |
| 228 | F | COOC$_2$H$_5$ | CN | COOC$_2$H$_5$ | 4-[N(CH$_2$CH=CH$_2$)(C$_2$H$_4$CN)]phenyl | dark blue |
| 229 | OC$_2$H$_5$ | CN | COOC$_2$H$_5$ | COOC$_2$H$_5$ | 3-methyl-4-[N(C$_2$H$_4$CN)(C$_2$H$_5$)]phenyl | dark blue |
| 230 | OC$_2$H$_5$ | CN | COOC$_2$H$_5$ | COOC$_2$H$_5$ | 4-[N(C$_4$H$_9$)(C$_2$H$_4$CN)]phenyl | blue |

-continued

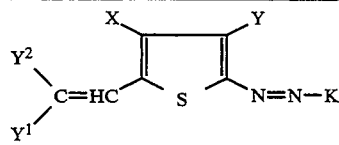

| Example No. | X | Y | Y¹ | Y² | —K | Dyeing on polyester |
|---|---|---|---|---|---|---|
| 231 | $OC_2H_5$ | CN | $COOC_2H_5$ | $COOC_2H_5$ | 4-methyl-3-methoxy-phenyl-$N(C_2H_5)_2$ | dark blue |
| 232 | $OC_2H_5$ | CN | $COOC_2H_5$ | $COOC_2H_5$ | 4-methyl-3-NHCOCH₃-phenyl-$N(C_4H_9)_2$ | blue |
| 233 | $OC_2H_5$ | CN | CN | CN | 4-methyl-3-CH₃-phenyl-$N(C_2H_5)(C_2H_4CN)$ | dark blue |
| 234 | $OC_2H_5$ | CN | $COCH_3$ | $COOC_2H_5$ | 4-methyl-3-NHCOCH₃-phenyl-$N(C_2H_5)(C_2H_4CN)$ | dark blue |
| 235 | $OC_2H_5$ | $COOC_2H_5$ | CN | $COOC_2H_5$ | 4-methyl-phenyl-$N(C_2H_5)_2$ | blue |
| 236 | $OC_2H_5$ | $COOC_2H_5$ | CN | $COOC_2H_5$ | 4-methyl-3-CH₃-phenyl-$N(C_2H_4OCOCH_3)_2$ | dark blue |
| 237 | $OC_2H_5$ | $COOC_2H_5$ | CN | $COOC_2H_5$ | 4-methyl-3-NHCOCH₃-phenyl-$N(C_2H_5)_2$ | blue |
| 238 | $OC_2H_5$ | $COOC_2H_5$ | $COOC_2H_5$ | $COOC_2H_5$ | 4-methyl-3-CH₃-phenyl-$N(C_2H_5)(C_2H_4CN)$ | dark blue |
| 239 | $OC_2H_5$ | $COOC_2H_5$ | $COCH_3$ | $COOC_2H_5$ | 4-methyl-3-CH₃-phenyl-$N(C_2H_5)(C_2H_4CN)$ | dark blue |

-continued

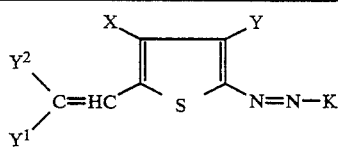

| Example No. | X | Y | Y¹ | Y² | —K | Dyeing on polyester |
|---|---|---|---|---|---|---|
| 240 | $OC_2H_5$ | $COOC_2H_5$ | $COCH_3$ | $COCH_3$ | 4-methyl-3-methylphenyl-N($C_2H_5$)($C_2H_4CN$) | bluish violet |
| 241 | $OC_2H_5$ | $COOC_2H_5$ | $COCH_3$ | CN | 4-methyl-3-methylphenyl-N($C_2H_5$)($C_2H_4CN$) | dark blue |
| 242 | $OC_2H_5$ | $\underset{\overset{\|}{C}-NH_2}{O}$ | CN | $COOC_2H_5$ | 4-methyl-3-methylphenyl-N($C_2H_4CN$)($CH_2CH=CH_2$) | dark blue |
| 243 | $OC_2H_5$ | $\underset{\overset{\|}{C}-NH_2}{O}$ | CN | $COOC_2H_5$ | 4-methyl-3-NHCOCH$_3$-phenyl-N($C_2H_5$)$_2$ | blue |
| 244 | $OC_2H_5$ | $SO_2CH_3$ | CN | $COOC_2H_5$ | 4-methyl-3-methylphenyl-N($C_2H_5$)($C_2H_4CN$) | dark blue |
| 245 | $OC_2H_5$ | $SO_2CH_3$ | CN | $COOC_2H_5$ | 4-methyl-3-methylphenyl-N($CH_2CH=CH_2$)$_2$ | dark blue |
| 246 | $OC_2H_5$ | $SO_2CH_3$ | CN | $COOC_2H_5$ | 4-methyl-3-NHCOCH$_3$-phenyl-N($C_2H_5$)$_2$ | blue |
| 247 | $OC_2H_5$ | CN | CN | $CON(CH_3)_2$ | 4-methylphenyl-N($C_2H_5$)($C_2H_4CN$) | reddish blue |
| 248 | $OC_2H_5$ | CN | CN | $COOC_2H_5$ | phenyl-N($C_2H_4OCCH_3$)$_2$ | reddish blue |

-continued

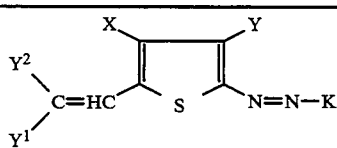

| Example No. | X | Y | Y¹ | Y² | —K | Dyeing on polyester |
|---|---|---|---|---|---|---|
| 249 | $OC_2H_5$ | CN | CN | $COOC_2H_5$ | 3-methyl-4-methylphenyl-N($C_2H_4CN$)($CH_2CH=CHCl$) | dark blue |
| 250 | $OC_2H_5$ | CN | CN | $COOC_2H_5$ | 3-methyl-4-methylphenyl-N($C_2H_5$)($C_2H_4OCCH_3$, C=O) | dark blue |
| 251 | $OC_2H_5$ | CN | CN | $COOC_2H_5$ | 3-methyl-4-methylphenyl-N($C_2H_5$)($C_2H_4COOCH_3$) | dark blue |
| 252 | $OC_2H_5$ | CN | CN | $COOC_2H_5$ | 3-methyl-4-methylphenyl-$N(C_2H_5)_2$ | dark blue |
| 253 | $OC_2H_5$ | CN | CN | $COOC_2H_5$ | 3-methyl-4-methylphenyl-$N(C_4H_9)_2$ | dark blue |
| 254 | $OC_2H_5$ | CN | CN | $COOC_2H_5$ | 4-methyl-2-$NHCOCH_3$-phenyl-$N(C_2H_5)_2$ | blue |
| 255 | $OC_2H_5$ | CN | CN | $COOC_2H_5$ | 4-phenyl-5-methyl-thiazol-2-yl-$N(C_2H_5)_2$ | blue |
| 256 | $OC_2H_5$ | CN | CN | $COOC_2H_5$ | 4,6-dimethyl-3-CN-2-$NHC_3H_6OC_2H_4OH$-6-$NHC_3H_6OCH_3$-pyridyl | blue |
| 257 | $OC_2H_5$ | CN | CN | $COOC_4H_9(n)$ | 4-methyl-2-$NHCOCH_3$-phenyl-$N(C_4H_9)_2$ | blue |

-continued

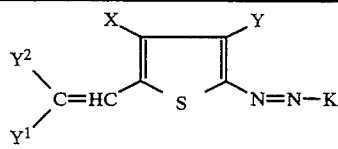

| Example No. | X | Y | Y¹ | Y² | —K | Dyeing on polyester |
|---|---|---|---|---|---|---|
| 258 | $OC_2H_5$ | CN | CN | $COOC_4H_9(n)$ | 4-$N(C_2H_5)_2$, 2-$NHCOCH_3$ phenyl | blue |
| 259 | $OC_2H_5$ | CN | CN | $COOC_4H_9(n)$ | 3-$CH_3$, 4-$N(C_2H_4COOC_4H_9)$ phenyl | blue |
| 260 | $OC_2H_5$ | CN | CN | $COOC_4H_9(n)$ | 3-$CH_3$, 4-$N(C_2H_5)(C_2H_4COC_2H_4OC_2H_5)$ phenyl with C=O | dark blue |
| 261 | $OC_2H_5$ | CN | CN | $CONH$–phenyl | 3-$CH_3$, 4-$N(C_2H_5)(C_2H_4CN)$ phenyl | dark blue |
| 262 | $OC_2H_5$ | CN | CN | phenyl | 3-$CH_3$, 4-$N(C_2H_5)(C_2H_4CN)$ phenyl | dark blue |
| 263 | $OC_2H_5$ | CN | CN | benzimidazol-2-yl (NH) | 3-$CH_3$, 4-$N(C_2H_5)(C_2H_4CN)$ phenyl | dark blue |
| 264 | $OC_2H_5$ | CN | CN | $CONH_2$ | 3-$CH_3$, 4-$N(C_2H_5)(C_2H_4CN)$ phenyl | dark blue |
| 265 | $OC_2H_5$ | CN | $COOC_2H_5$ | $COOC_2H_5$ | 4-$N(C_4H_9)_2$ phenyl | navy blue. |
| 266 | $OC_2H_5$ | CN | $COCH_3$ | $COOC_2H_5$ | 3-$CH_3$, 4-$N(CH_2CH=CH_2)(C_2H_4OH)$ phenyl | dark blue |

-continued

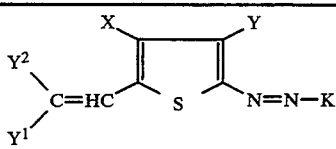

| Example No. | X | Y | Y¹ | Y² | —K | Dyeing on polyester |
|---|---|---|---|---|---|---|
| 267 | $OC_2H_5$ | CN | CN | $CONHCH_3$ | 4-methyl-3-methylphenyl-N($CH_2CH=CH_2$)($C_2H_4OH$) | dark blue |
| 268 | $OC_2H_5$ | CN | CN | $COOC_2H_5$ | methylphenyl with $N(C_2H_5)_2$ and $NHSO_2CH_3$ | navy blue |
| 269 | $OC_2H_5$ | CN | CN | $COOC_2H_5$ | 3-methyl-4-methyl-5-hydroxy-1-phenylpyrazole | violet |
| 270 | $OC_2H_5$ | CN | CN | $COOC_2H_5$ | 5-amino-4-methyl-1-benzylpyrazole | violet |
| 271 | $OC_2H_5$ | CN | CN | $COOC_2H_5$ | 2-(N-methyl-C-phenyl) indoline type | violet |
| 272 | $OC_2H_5$ | CN | CN | $CONHCH_3$ | 4-methyl-3-methylphenyl-N($C_2H_4CN$)($CH_2CH=CH_2$) | dark blue |
| 273 | $OC_2H_5$ | CN | CN | $CONHC_2H_5$ | 4-methyl-3-methylphenyl-N($C_2H_4CN$)($CH_2CH=CH_2$) | dark blue |
| 274 | $OC_2H_5$ | CN | CN | $SO_2CH_3$ | 4-methyl-3-methylphenyl-N($C_2H_4CN$)($CH_2CH=CH_2$) | dark blue |

-continued

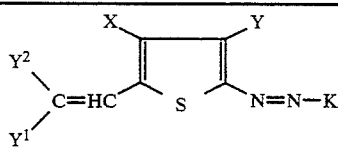

| Example No. | X | Y | Y¹ | Y² | —K | Dyeing on polyester |
|---|---|---|---|---|---|---|
| 275 | $OC_2H_5$ | CN | CN | $COCH_3$ | 4-methyl-3-methylphenyl-N($C_2H_4CN$)($CH_2CH=CH_2$) | dark blue |
| 276 | $OC_2H_5$ | CN | CN | $COOCH_3$ | 4-methyl-3-methylphenyl-N($C_2H_4CN$)($CH_2CH=CH_2$) | dark blue |
| 277 | $OCH_3$ | CN | CN | $COOC_2H_5$ | 4-methylphenyl-N($C_2H_5$)($C_2H_4OCOCH_3$) | bluish violet |
| 278 | $OC_6H_5$ | CN | CN | $COOC_2H_5$ | 4-methylphenyl-N($C_2H_5$)($C_2H_4CN$) | bluish violet |
| 279 | $SC_6H_5$ | CN | CN | $COOC_2H_5$ | 4-methylphenyl-N($C_2H_5$)($C_2H_4OCH_3$) | bluish violet |
| 280 | $SC_6H_5$ | CN | CN | $COOC_2H_5$ | 4-methyl-3-methylphenyl-N($C_2H_5$)$_2$ | dark blue |
| 281 | $OCH_3$ | CN | CN | $COOC_2H_5$ | 4-methyl-3-methylphenyl-N($C_2H_4CN$)($CH_2CH=CH_2$) | dark blue |
| 282 | $OCH_3$ | CN | CN | $COOC_2H_5$ | 2,4,5-trimethylphenyl-NHCH$_2$H$_4$COOCH$_3$ | blue |
| 283 | $OCH_3$ | CN | CN | $COOC_4H_9(n)$ | 4-methyl-3-methylphenyl-N($C_2H_5$)($C_2H_4OCOC_2H_5$) | blue |
| 284 | $OC_6H_5$ | CN | CN | $COOC_2H_5$ | 4-methylphenyl-N($CH_3$)$_2$ | dark blue |

-continued

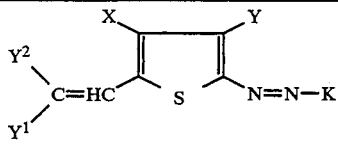

| Example No. | X | Y | Y¹ | Y² | —K | Dyeing on polyester |
|---|---|---|---|---|---|---|
| 285 | $SC_6H_5$ | CN | CN | $COOC_2H_5$ | ―⟨ ⟩―$N(C_2H_5)_2$ | dark blue |
| 286 | $SC_6H_5$ | CN | CN | $COOC_2H_5$ | ―⟨ ⟩―$N(CH_2CH=CH_2)_2$ (3-$CH_3$) | dark blue |
| 287 | $SC_6H_5$ | CN | CN | $COOC_2H_5$ | ―⟨ ⟩―N($C_2H_5$)($C_2H_4OCOCH_3$) | dark blue |
| 288 | $SC_2H_5$ | CN | CN | $COOC_2H_5$ | ―⟨ ⟩―N($CH_2CH=CH_2$)($C_2H_4CN$) | dark blue |
| 289 | $SC_2H_5$ | $COOC_2H_5$ | CN | $COOC_2H_5$ | ―⟨ ⟩―N($CH_2CH=CH_2$)($C_2H_4CN$) | dark blue |

EXAMPLE 290 a) 18.6 parts of 2-amino-4-chloro-3-cyano-5-formyl-thiophene were suspended in 140 parts by volume of ethanol, and 2 parts of glacial acetic acid and 2 parts of piperidine were added. Thereafter, 50 parts by volume of ethyl cyanoacetate were added dropwise at room temperature and the mixture was stirred for 7 hours at 60° C. It was then introduced into 500 parts of an ice/-water mixture, and the precipitate was filtered off under suction, washed with water and dried at 60° C. under reduced pressure to give 20 parts of 2-amino-4-chloro-3-cyano-5-(β-cyano-β-carboethoxyvinyl)-thiophene of the formula

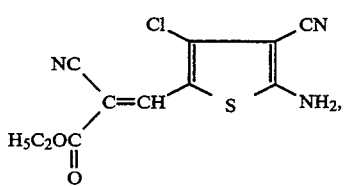

which was reacted without further purification.

b) 14 parts of this product were suspended in 100 parts by volume of 85% strength phosphoric acid, and 16 parts of nitrosylsulfuric acid (11.5% of $N_2O_3$) were added slowly at 0°–5° C. After 2 hours at this temperature, the diazonium salt solution was run into a solution of 9.75 parts of N-cyanoethyl-N-ethyl-m-toluidine in a mixture of 125 parts of water, 500 parts of ice, 25 parts by volume of 32% strength hydrochloric acid and 1 part of amidosulfonic acid. When coupling was complete, the dye was filtered off under suction, washed neutral and dried under reduced pressure to give 20 parts of the dye described in Example 155, of the formula

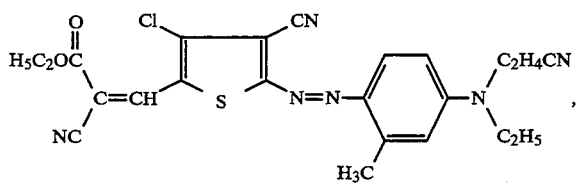

On polyesters, this dye gives dark blue dyeings having generally good fastness properties.

EXAMPLE 291

14.5 parts of 2-amino-3-cyano-4-ethoxy-5-(β-cyano-β-carboethoxyvinyl)-thiophene were suspended in 160 parts by volume of 85% strength phosphoric acid and diazotized with 16 parts of nitrosylsulfuric acid (11.5% of $N_2O_3$) at 0°–5° C. After 2 hours at this temperature, the diazonium salt solution was reacted with 9.75 parts of N-cyanoethyl-N-ethyl-m-toluidine similarly to Example 290 to give 20 parts of the dye of the formula

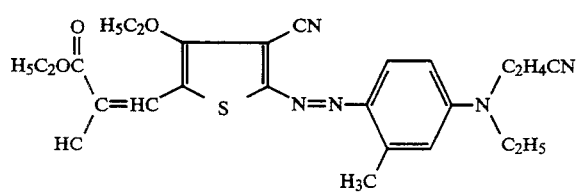

which, on polyesters, gives blue dyeings possessing good lightfastness and fastness to dry heat pleating and setting.

EXAMPLE 292

14 parts of 2-amino-4-chloro-3-cyano-5-($\beta$-cyano-$\beta$-methylaminocarbonyl)-vinyl)-thiophene were suspended in 120 parts by volume of 85% strength phosphoric acid and reacted with 16 parts of nitrosylsulfuric acid at 0°–5° C., and the mixture was stirred for 2 hours at this temperature. The diazonium salt solution was run slowly into a mixture of 7.5 parts of N,N-diethylaniline, 100 parts of water, 300 parts of ice, 25 parts by volume of 32% strength hydrochloric acid and 1 part of amidosulfonic acid. When coupling was complete, the suspension was filtered and the residue was washed neutral and dried to give 16 parts of the dye of the formula

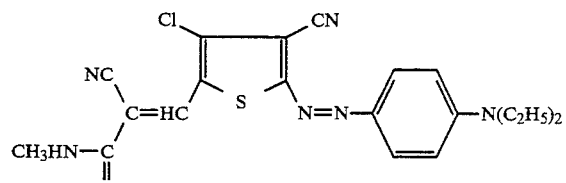

which, on polyesters, gives dark blue dyeings possessing generally good fastness properties.

The compounds characterized in the Table below were obtained similarly to Examples 290–292.

| Example No. | X | Y | $Y^1$ | $Y^2$ | —K | *) |
|---|---|---|---|---|---|---|
| 293 | Br | CN | CN | COOCH$_3$ | —C$_6$H$_4$—N(C$_2$H$_5$)$_2$ | dark blue |
| 294 | Br | CN | CN | COOCH$_3$ | —C$_6$H$_4$—N(C$_2$H$_4$OCCH$_3$)$_3$ | dark blue |
| 295 | Br | CN | CN | COOCH$_3$ | —C$_6$H$_3$(NHCOCH$_3$)—N(C$_2$H$_5$)$_2$ | blue |
| 296 | Br | CN | CN | COOCH$_3$ | phenyl-thiazole-N(C$_2$H$_5$)$_2$ | blue |
| 297 | Cl | CN | CN | COOC$_2$H$_5$ | —C$_6$H$_4$—N(CH$_2$CH=CH$_2$)$_2$ | dark blue |
| 298 | Cl | CN | CN | COOC$_2$H$_5$ | —C$_6$H$_3$(CH$_3$)—N(C$_4$H$_9$)$_2$ | dark blue |
| 299 | Cl | CN | CN | COOC$_2$H$_5$ | —C$_6$H$_4$—N(C$_2$H$_4$CN)(CH$_2$CH=CH$_2$) | dark blue |

-continued

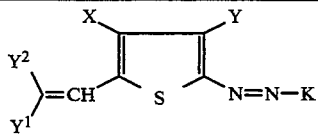

| Example No. | X | Y | Y¹ | Y² | —K | *) |
|---|---|---|---|---|---|---|
| 300 | Cl | CN | CN | COOC₂H₅ | (4-phenyl-2-diethylamino-thiazol-5-yl) | dark blue |
| 301 | Cl | CN | CN | CONHCH₃ | —C₆H₄—N(C₂H₅)₂ | dark blue |
| 302 | Cl | COOCH₃ | CN | COOC₂H₅ | —C₆H₄—N(C₂H₅)₂ | dark blue |
| 303 | Cl | SO₂CH₃ | CN | COOC₂H₅ | 3-methyl-4-[N(C₂H₅)(C₂H₄CN)]phenyl | dark blue |
| 304 | Cl | CN | CN | COOC₂H₅ | 3,4-dimethyl-5-cyano-2,6-bis(NHC₂H₄OCH₃)pyridin-yl | reddish blue |
| 305 | F | CN | CN | COOC₂H₅ | 3-methyl-4-[N(CH₂CH=CH₂)(C₂H₄CN)]phenyl | dark blue |
| 306 | F | CN | CN | COOC₂H₅ | —C₆H₄—N(C₄H₉)₂ | dark blue |
| 307 | F | CN | CN | COOC₂H₅ | 3-methoxy-4-N(C₂H₅)₂-phenyl | blue |
| 308 | Cl | CN | CN | CN | —C₆H₄—N(C₂H₅)₂ | blue |
| 309 | OC₂H₅ | CN | CN | COOCH₃ | —C₆H₄—N(C₂H₅)₂ | dark blue |

-continued

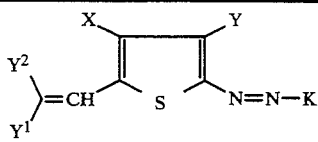

| Example No. | X | Y | Y¹ | Y² | —K | *) |
|---|---|---|---|---|---|---|
| 310 | $OC_2H_5$ | CN | CN | $COOCH_3$ | 4-$N(C_2H_5)_2$, 3-$NHCOCH_3$ phenyl | blue |
| 311 | $OCH_3$ | CN | CN | $COOC_2H_5$ | 4-$N(CH_2CH=CH_2)_2$ phenyl | dark blue |
| 312 | $OC_2H_5$ | CN | CN | $COOC_2H_5$ | 4-$N(C_4H_9)_2$, 3-$CH_3$ phenyl | dark blue |
| 313 | $SC_6H_5$ | CN | CN | $COOC_2H_5$ | 4-$N(C_2H_4CN)(CH_2CH=CH_2)$ phenyl | dark blue |
| 314 | $OC_2H_5$ | CN | CN | $COOCH_3$ | 4-$N(C_2H_5)_2$ phenyl | dark blue |
| 315 | $SC_6H_5$ | CN | CN | $COOC_2H_5$ | 4-$N(CH_2CH=CH_2)(C_2H_4CN)$, 3-$CH_3$ phenyl | dark blue |

*)Dyeing on polyester

The following dyes characterized by the substituents can also be prepared similarly to the methods described:

| Example No. | T | X | Y | —K | Color on polyester |
|---|---|---|---|---|---|
| 316 | CHO | Cl | CN | 4-$N(C_2H_5)_2$, 3-$NHCOCH_2OCH_3$ phenyl | blue |
| 317 | CHO | Cl | CN | 4-$N(C_4H_9)_2$, 3-$NHCOCH_2OCH_3$ phenyl | greenish blue |

-continued
| Example No. | T | X | Y | —K | Color on polyester |
|---|---|---|---|---|---|
| 318 | CHO | Cl | CN | 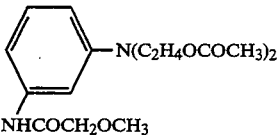 | blue |
| 319 | CHO | Cl | CN | 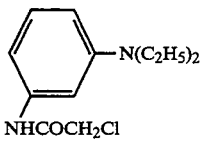 | blue |
| 320 | CHO | Cl | CN | 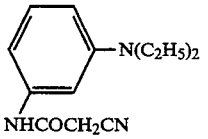 | blue |
| 321 | CHO | Cl | CN | 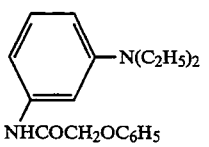 | blue |
| 322 | CHO | Br | CN | 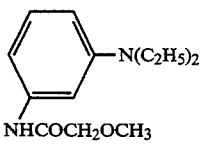 | blue |
| 323 | CHO | Cl | CN | 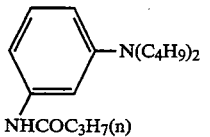 | blue |
| 324 | CHO | Cl | CN | 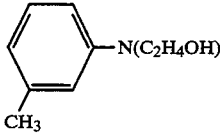 | blue |
| 325 | CHO | Cl | CN | 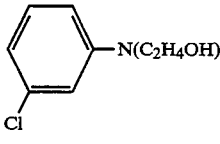 | reddish blue |
| 326 | CHO | Cl | CN | 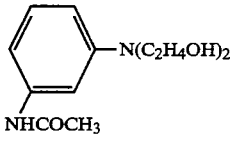 | blue |
| 327 | CHO | Cl | CN | 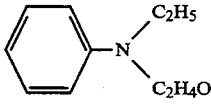 | reddish blue |

-continued

| Example No. | T | X | Y | —K | Color on polyester |
|---|---|---|---|---|---|
| 328 | CHO | Cl | CN | 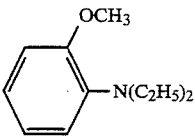 2-OCH₃, 1-N(C₂H₅)₂ phenyl | blue |
| 329 | CHO | Cl | CN | 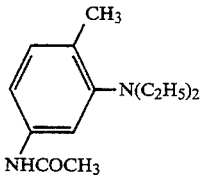 3-CH₃, 2-N(C₂H₅)₂, 5-NHCOCH₃ phenyl | blue |
| 330 | CHO | Cl | CN |  3-N(C₂H₅)₂, 5-NHCOOC₂H₅ phenyl | blue |
| 331 | CHO | Cl | CN | 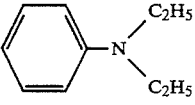 N(C₂H₅)(C₂H₅) phenyl | blue |
| 332 | CHO | Cl | CN | 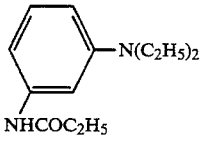 3-N(C₂H₅)₂, 5-NHCOC₂H₅ phenyl | blue |
| 333 | CN | Cl | CN | 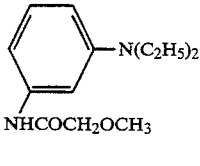 3-N(C₂H₅)₂, 5-NHCOCH₂OCH₃ phenyl | blue |
| 334 | CN | Cl | CN | 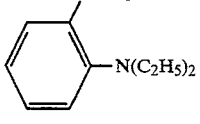 2-OCH₃, 1-N(C₂H₅)₂ phenyl | blue |
| 335 | NO₂ | Cl | CN | 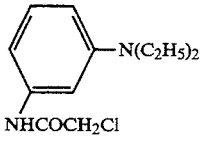 3-N(C₂H₅)₂, 5-NHCOCH₂Cl phenyl | greenish blue |
| 336 | NO₂ | Cl | CN | 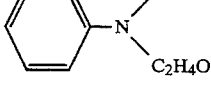 N(C₂H₅)(C₂H₄OH) phenyl | blue |
| 337 | NO₂ | Cl | CN | 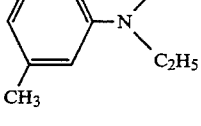 3-CH₃, N(C₂H₄CN)(C₂H₅) phenyl | blue |

-continued

| Example No. | T | X | Y | —K | Color on polyester |
|---|---|---|---|---|---|
| 338 | CN | Cl | CN | 3-N(C$_2$H$_5$)$_2$, NHCOCH$_3$ phenyl | blue |
| 339 | CN | Cl | CN | 3-N(C$_2$H$_4$OH)$_2$, NHCOC$_2$H$_5$ phenyl | blue |
| 340 | CN | Cl | CN | 3-N(C$_2$H$_5$)$_2$, NHC(O)OC$_2$H$_5$ phenyl | blue |
| 341 | CHO | Cl | CN | 3-N(C$_2$H$_4$OH)$_2$, 4-CH$_3$ phenyl | blue |
| 342 | CHO | Cl | CN | 3-N(C$_2$H$_4$OH)(C$_2$H$_5$), 4-CH$_3$ phenyl | blue |
| 343 | CHO | Cl | CN | N(C$_2$H$_4$OH)(C$_2$H$_5$) phenyl | reddish blue |
| 344 | CHO | Cl | CN | 2-OCH$_3$, N(C$_2$H$_4$OCOCH$_3$)$_2$ phenyl | blue |
| 345 | CHO | Cl | CN | 2-OCH$_3$, 4-OCH$_3$, N(CH$_2$CH=CH$_2$)(C$_2$H$_4$CO$_2$CH$_3$) phenyl | blue |
| 346 | CHO | Br | CN | 3-N(C$_2$H$_4$OH)(C$_2$H$_5$), 4-CH$_3$ phenyl | blue |
| 347 | CHO | Br | CN | 2-OCH$_3$, 4-CH$_3$, N(C$_2$H$_4$OCOCH$_3$)$_2$ phenyl | blue |

-continued

| Example No. | T | X | Y | —K | Color on polyester |
|---|---|---|---|---|---|
| 348 | CHO | C₆H₅S | CN | ![structure: phenyl-N(C₂H₄OH)(C₂H₅)] | reddish blue |
| 349 | CHO | C₆H₅S | CN | ![structure: 2,5-dimethoxyphenyl-N(C₂H₄OCOCH₃)₂] | greenish blue |
| 350 | CHO | OC₂H₅ | CN | ![structure: 3-methylphenyl-N(C₂H₄OH)₂] | reddish blue |
| 351 | CHO | C₆H₅SO₂ | CN | ![structure: 2-methoxyphenyl-N(C₂H₄OCOCH₃)₂] | blue |
| 352 | CHO | C₆H₅SO₂ | CN | ![structure: 3-methylphenyl-N(C₂H₅)(C₂H₄OH)] | blue |
| 353 | CN | Cl | CN | ![structure: 3-methylphenyl-N(C₂H₄OH)₂] | reddish blue |
| 354 | CN | Cl | CN | ![structure: 2-methoxy-5-methylphenyl-N(C₂H₄OCOCH₃)₂] | blue |
| 355 | H₅C₂O₂C(CN)C=CH— | Cl | CN | ![structure: phenyl-N(C₂H₅)(C₂H₄OH)] | blue |

EXAMPLE 356

2 parts of the dye described in Example 3, in 30 parts by volume of dimethylformamide and 50 parts by volume of glacial acetic acid, were stirred and 0.7 part of aniline was added. Stirring was continued for 12 hours at room temperature and 500 parts of water were added and the mixture was filtered under suction to give 2.2 parts of a powder of the formula

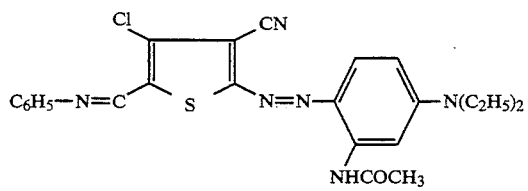

which dyes polyester fabric in fast blue hues.

EXAMPLE 357

A suspension of 4 parts of the dye described in Example 3 in 50 parts by volume of dimethylformamide and 2 drops of concentrated sulfuric acid were added to 1.1 parts of phenylhydrazine in 40 parts by volume of ethanol. The mixture was stirred for 12 hours at 25° C., after which 500 parts of water were added and the dye of the formula

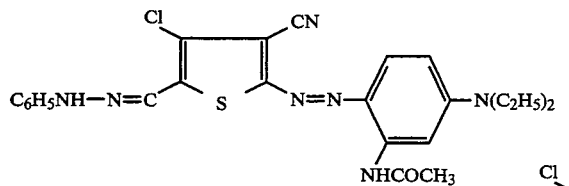

was filtered off under suction and dried. 5 parts of a black powder which dyes polyester fabric in fast blue hues were obtained.

EXAMPLE 358

2.3 parts of the dye described in Example 23 were stirred in 50 parts by volume of formic acid, 0.5 part of hydroxylamine hydrochloride and 0.5 part of sodium formate for 12 hours at room temperature. 400 parts of water were added, after which the mixture was filtered under suction to give 2.4 parts of the dye of the formula

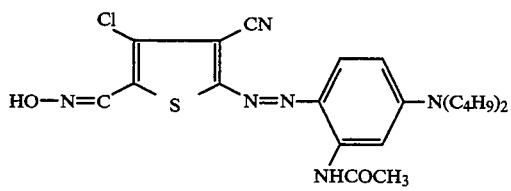

which dyes polyester fabric in fast blue hues.

EXAMPLE 359

18.7 parts of 2-amino-3-cyano-4-chloro-5-formylthiophene in 120 parts by volume of glacial acetic acid and 40 parts by volume of propionic acid were stirred for 1 hour at room temperature, after which the mixture was cooled to 0°-5° C., 31 parts of 42% strength nitrosylsulfuric acid were added and stirring was continued for about one hour at this temperature.

The coupling component employed was obtained as follows: a thoroughly stirred mixture of 17 parts (based on dry substance) of water-moist 2-chloro-3-cyano-4-methyl-6-aminopyridine (obtained, for example, by the process described in German Patent 2,260,827), 20 parts by volume of isobutanol, 18 parts of 3-aminopropyl 4-hydroxybutyl ether and 8 parts of sodium carbonate was heated under a descending condenser for 5 hours at 145°-150° C. until a thin layer chromatogram showed that conversion was complete. The mixture was cooled to about 100° C., after which 35 parts of acetic acid were added dropwise and 15 parts of 96% strength sulfuric acid were introduced dropwise at 35°-40° C. with further slight cooling. Stirring was continued for 3 hours, after which about 92% of the hydroxy compound were found to be acetylated. The solution of the diazonium salt was run into a thoroughly stirred mixture of 100 parts of the resulting coupling component, 300 parts of ice and 100 parts of water, and stirring was continued for about 2 hours at 0°-5° C. until the diazonium salt solution had been consumed. Thereafter, the coupling mixture was filtered under suction and the residue was washed neutral and dried at 80° C. The greenish black powder contains about 90% of the compound of the formula

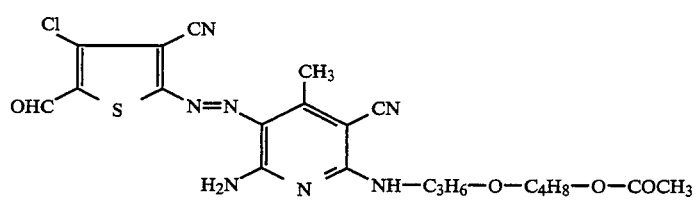

[$\lambda_{max}$: 546 nm (9:1 dimethylformamide/acetic acid)] as well as about 10% of the non-acetylated hydroxy compound.

The dye mixture possesses very good tinctorial properties and, on polyester, gives very deep, brilliant, reddish violet dyes possessing very good lightfastness and fastness to plating.

EXAMPLE 360

When an equivalent amount of the coupling component described below was used under the preparation conditions of the above example, the reddish blue dye 9$\lambda_{max}$: 572 nm, 9:1 dimethylformamide/acetic acid) of the formula

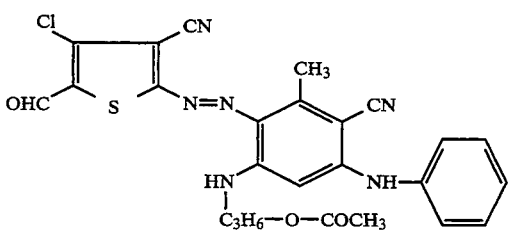

was obtained. The product still contained about 5% of the hydroxy compound.

The coupling component used was obtained as follows: 45 parts of 2-chloro-3-cyano-4-methyl-6-(3'-hydroxypropylamino)-pyridine (obtained as described in German Patent 2,260,827) were stirred in the presence of one part of p-toluenesulfonic acid in 37 parts of aniline for one hour at 125° C. A total of 10 parts of sodium carbonate were added at 135° C. in three portions at 10 minute intervals, and stirring was continued for about 4 hours at 145° C. until a thin layer chromatogram showed that conversion was complete. Excess aniline was distilled off under reduced pressure, and the hot melt was discharged on to 200 parts by volume of hot water. The aqueous solution was decanted, and the remaining melt was stirred several times with hot water containing acetic acid and was separated off cold. After drying, 14.2 parts of the melt, consisting of 2- phenylamino-3-cyano-4-methyl-6-(3'-hydroxypropylamino)pyridine, were dissolved in 50 parts by volume of glacial acetic acid, and 6 parts of 96% strength sulfuric acid were added dropwise. The mixture was stirred for 3 hours at 60° C., after which the solution was used directly in the coupling reaction described.

The dyes listed in Table I were also obtained in a similar manner, these dyes having a similar property spectrum. The $\lambda_{max}$ values were determined in a 9:1 mixture of dimethylformamide and acetic acid.

TABLE 1

[Structure: thiophene with OHC and S, substituents X and Y, linked via N=N to a pyridine bearing CH$_3$, CN, $R^1$HN and NHR$^2$ groups]

| Example No. | X | Y | $R^1$ | $R^2$ | $\lambda_{max}$ [nm] |
|---|---|---|---|---|---|
| 361 | Cl | CN | H | C$_3$H$_6$OC$_4$H$_8$OCOC$_2$H$_5$ | 545.5 |
| 362 | Cl | CN | H | C$_3$H$_6$OC$_2$H$_7$OC$_2$H$_5$ | 547 |
| 363 | Cl | CN | H | C$_3$H$_6$OC$_2$H$_4$OC$_4$H$_9$ | 546.8 |
| 364 | Cl | CN | C$_2$H$_4$OCH$_3$ | 2-methoxyphenyl | 565 |
| 365 | Cl | CN | cyclohexyl | 2-methoxyphenyl | 567 |
| 366 | Cl | CN | 3-methylcyclohexyl | 4-methoxyphenyl | 573 |
| 367 | OC$_2$H$_5$ | CN | H | C$_3$H$_6$OC$_4$H$_8$OCOCH$_3$ | 538 |
| 368 | OC$_2$H$_5$ | CN | H | C$_3$H$_6$OC$_2$H$_4$OC$_2$H$_5$ | 540 |
| 369 | OC$_2$H$_5$ | CN | C$_3$H$_6$OCOCH$_3$ | phenyl | 560.5 |
| 370 | OC$_2$H$_5$ | CN | C$_3$H$_6$OH | 4-methoxyphenyl | 569 |
| 371 | phenylthio | CN | H | C$_3$H$_6$OC$_4$H$_6$OCOCH$_3$ | 540 |
| 372 | phenoxy | CN | H | C$_3$H$_6$OC$_4$H$_8$OCOCH$_3$ | 540 |

EXAMPLE 373

14.6 parts of 2-amino-3-cyano-4-ethoxy-5-(2'-cyano-2'-carbethoxyvinyl)-thiophene were diazotized similarly to the procedure described in Example 359 but using half the amount of reagents and assistants, and the product was coupled to 2-(4'-acetoxybutoxy)-3'-propylamino-3-cyano-4-methyl-6-aminopyridine. This gives a bluish black powder of the formula

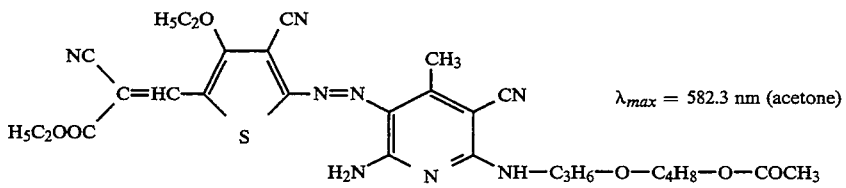

$\lambda_{max} = 582.3$ nm (acetone)

which still contains about 10% of the hydroxy compound and dyes polyester materials in medium blue hues which have very good lightfastness, fastness to washing and fastness to plating.

The diazo component was obtained as follows: 60 parts of 2-amino-3-cyano-4-ethoxythiophene-5-carbaldehyde in 200 parts by volume of dimethylformamide and 57 parts of ethyl cyanoacetate were stirred at room temperature. 10 parts by volume of a saturated aqueous sodium acetate solution were added dropwise, and stirring was continued for 2 hours at 40° C. Precipitation was completed by adding 1,000 mL of ice-cold methanol, and the product was filtered off, washed first with ice-cold methanol and then with water, and dried at 60° C. Yield: 60 parts (67.4%).

EXAMPLE 374

The procedure described in Example 359 was used, but with half the amount of reagents and assitants, and 14.1 parts of 2-amino-3-cyano-4-chloro-5-(2'-cyano-2'-carbethoxyvinyl)-thiophene were diazotized and the product coupled to 2-(4'-acetoxybutoxy)-3'-propylamino-3-cyano-4-methyl-6-(3'-acetoxypropylamino)-pyridine.

This gives a black powder which consists of 90% of the compound of the formula

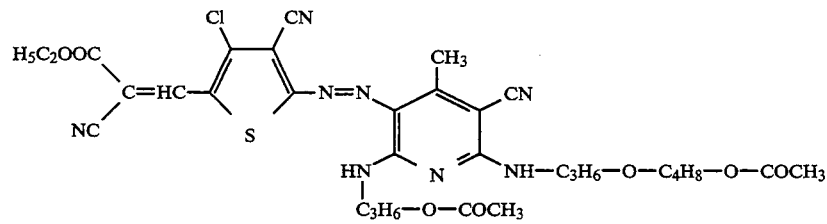

($\lambda_{max} = 585.5$ nm; acetone) and dyes polyester in medium blue hues which have very good lightfastness, fastness to washing and fastness to plating.

The diazo component was obtained by a method similar to that described in Example 373, and the coupling component was obtained as follows:

45 parts of 2-chloro-3-cyano-4-methyl-6-(3'-hydroxypropylamino)-pyridine (obtained as described in German Patent 2,260,827) were stirred for 5 hours at 145° C. in the presence of 14 parts of sodium carbonate in 33 parts of 3-aminopropyl 4-hydroxybutyl ether, and the mixture was cooled to 100° C. and discharged on to 120 parts by volume of glacial acetic acid. 41 g of 96% strength sulfuric acid were then added dropwise at 30° C. The mixture was stirred for 3 hours at 40° C., after which a quarter of the solution was converted to the dye, as described above.

The dyes in Table 2, which have similar properties, were obtained in a similar manner. The $\lambda_{max}$ values were determined in acetone, except for those marked with *, which were measured in a 9:1 dimethylformamide/acetic acid mixture.

TABLE 2

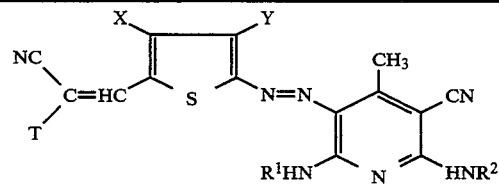

| Example No. | T | X | Y | $R^1$ | $R^2$ | $\lambda_{max}$ [nm] |
|---|---|---|---|---|---|---|
| 375 | COOC$_2$H$_5$ | OC$_2$H$_5$ | CN | H | C$_3$H$_6$OCH$_3$ | 583 |
| 376 | COOC$_2$H$_5$ | OC$_2$H$_5$ | CN | H | CH—CH$_2$—OCH$_3$<br>\|<br>CH$_3$ | 580.5 |
| 377 | COOC$_2$H$_5$ | OC$_2$H$_5$ | CN | H | C$_3$H$_6$OC$_2$H$_4$OC$_2$H$_5$ | 594* |
| 378 | COOC$_2$H$_5$ | OC$_2$H$_5$ | CN | C$_3$H$_6$OCH$_3$ | C$_3$H$_6$OC$_4$H$_8$OCOCH$_3$ | 597* |
| 379 | COOC$_2$H$_5$ | OC$_2$H$_5$ | CN | C$_2$H$_4$OH | C$_3$H$_6$OC$_2$H$_4$OC$_2$H$_5$ | 602.3* |
| 380 | COOC$_2$H$_5$ | OC$_2$H$_5$ | CN | C$_3$H$_6$OC$_2$H$_4$OCH$_3$ | C$_3$H$_4$OCOCH$_3$ | 591.5 |
| 381 | COOC$_2$H$_5$ | OC$_2$H$_5$ | CN | C$_2$H$_4$OCOCH$_3$ | C$_3$H$_6$OC$_2$H$_4$OC$_2$H$_5$ | 591.5 |
| 382 | COOC$_2$H$_5$ | OC$_2$H$_5$ | CN | C$_3$H$_6$OCOCH$_3$ | C$_3$H$_6$OC$_4$H$_8$OCOCH$_3$ | 594 |
| 383 | COOC$_2$H$_5$ | OC$_2$H$_5$ | CN | C$_3$H$_6$OC$_4$H$_8$OCOCH$_3$ | C$_3$H$_6$OC$_4$H$_8$OCOCH$_3$ | 594 |
| 384 | CN | OC$_2$H$_5$ | CN | H | C$_3$H$_6$OC$_4$H$_8$OCOCH$_3$ | 583 |
| 385 | CN | OC$_2$H$_5$ | CN | C$_3$H$_6$OCH$_3$ | C$_3$H$_6$OC$_4$H$_6$OCOCH$_3$ | 595 |
| 386 | CN | OC$_2$H$_5$ | CN | C$_3$H$_6$OCOCH$_3$ | C$_3$H$_6$OC$_4$H$_8$OCOCH$_3$ | 595 |

TABLE 2-continued

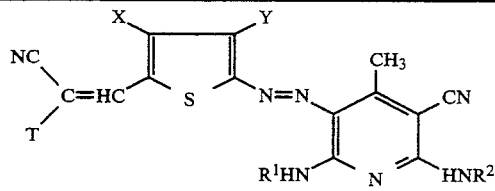

| Example No. | T | X | Y | R¹ | R² | λmax [nm] |
|---|---|---|---|---|---|---|
| 387 | CN | Cl | CN | C₃H₆OCOCH₃ | –C₆H₅ (phenyl) | 613.5* |
| 388 | CN | Cl | CN | C₃H₄OH | C₃H₆OC₂H₄OC₂H₅ | 605.3* |
| 389 | CN | Cl | CN | H | C₃H₆OC₂H₄OC₂H₅ | 578 |
| 390 | COOCH₃ | Cl | CN | H | C₃H₆OC₄H₈OCOCH₃ | 577 |
| 391 | COOC₂H₅ | Cl | CN | H | C₃H₆OCH₃ | 578 |
| 392 | COOC₂H₅ | Cl | CN | H | CH(CH₃)—CH₂—OCH₃ | 575.5 |
| 393 | COOC₂H₅ | Cl | CN | H | –C₆H₅ (phenyl) | 588 |
| 394 | CN | Cl | CN | C₃H₆OCOCH₃ | C₃H₆OC₄H₈OCOCH₃ | 586 |
| 395 | COOC₂H₅ | Cl | CN | C₃H₆OCH₃ | C₃H₆OC₂H₄OC₄H₉ | 588 |
| 396 | COOC₂H₅ | Cl | CN | C₃H₆OCH₃ | C₃H₆OC₄H₈OCOCH₃ | 585.5 |
| 397 | COOC₂H₅ | Cl | CN | C₂H₄OCOCH₃ | C₃H₆OC₂H₄OC₂H₅ | 586 |
| 398 | COOC₂H₅ | Cl | CN | C₃H₈OC₄H₈OCOCH₃ | –C₆H₅ (phenyl) | 612* |
| 399 | CN | Cl | CN | C₃H₆OC₄H₈OCOCH₃ | C₃H₈OC₄H₈OCOCH₃ | 586 |

EXAMPLE 400

7.3 parts of 2-amino-3-cyano-5-formyl-4-phenylsulfonylthiophene in 30 parts by volume of 85% strength sulfuric acid were stirred at no higher than 30° C. 8.3 parts of nitrosylsulfuric acid (11.5% of N₂O₃) were added dropwise at 0°–5° C., after which stirring was continued for 4 hours at this temperature.

This diazonium salt solution was diluted with 20 ml of concentrated sulfuric acid and then run slowly, at 0° C., into a solution of 6.6 parts of 3-[N,N-di-n-butylamino]-acetanilide in a mixture of 25 parts by volume of dimethylformamide, 125 parts of water, 300 parts of ice and 0.5 part of amidosulfonic acid. When coupling was complete, the dye was filtered off under suction, washed neutral and dried, and 12 parts of the dye of the formula

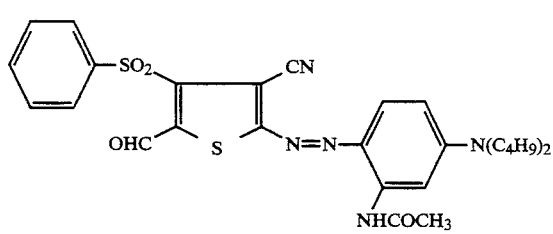

were obtained. This dye dyes polyester fibers in fast blue hues.

EXAMPLE 401

7.3 parts of 2-amino-3-cyano-5-formyl-4-phenylsulfonylthiophene were diazotized by a method similar to that described in the Example above.

The diazonium salt solution was added dropwise, at 0° C., to a solution of 5.2 parts of 3-(N,N-diethylamino)-acetanilide in a mixture of 125 parts of water, 350 parts of ice, 10 parts by volume of 32% strength hydrochloric acid and 0.5 part of amidosulfonic acid. When coupling was complete, the dye was filtered off under suction, washed neutral and dried, and 10.5 parts of a powder of the formula

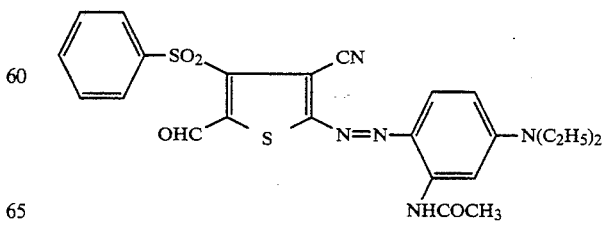

were obtained. This dye dyes polyester fabric in fast blue hues.

The dyes shown in the Table below were obtained in a similar manner.

$$\begin{array}{c} X \quad Y \\ \diagdown \diagup \\ \| \quad \| \\ T \diagup S \diagdown N{=}N{-}K \end{array}$$

| Example No. | T | X | Y | —K | Dyeing on polyester |
|---|---|---|---|---|---|
| 402 | CHO | $C_6H_5SO_2$ | CN | 4-$N(C_2H_4OCOCH_3)_2$, 2-$OCH_3$, 5-$NHCOCH_3$ phenyl | greenish blue |
| 403 | CHO | $C_6H_5SO_2$ | CN | 4-$N(C_2H_5)_2$ phenyl | bluish violet |
| 404 | CHO | $C_6H_5SO_2$ | CN | 4-$N(C_2H_5)_2$, 3-$CH_3$ phenyl | blue |
| 405 | CHO | $C_6H_5SO_2$ | CN | 4-$N(C_2H_4OCOCH_3)_2$, 3-$NHCOCH_3$ phenyl | blue |
| 406 | CHO | $C_6H_5SO_2$ | CN | 4-$N(C_2H_4CN)(CH_2CH{=}CH_2)$, 3-$NHCOC_6H_5$ phenyl | blue |
| 407 | CHO | $C_6H_5SO_2$ | CN | 4-$N(C_2H_4CN)(C_2H_5)$, 3-$CH_3$ phenyl | reddish blue |
| 408 | CHO | $C_6H_5SO_2$ | CN | 4-$N(C_2H_4CN)(C_2H_5)$ phenyl | bluish violet |
| 409 | CHO | $C_6H_5SO_2$ | CN | 4-$N(C_2H_4OCOCH_3)_2$, 2,5-di-$OCH_3$ phenyl | greenish blue |

-continued

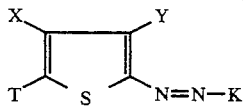

| Example No. | T | X | Y | —K | Dyeing on polyester |
|---|---|---|---|---|---|
| 410 | CHO | $C_6H_5SO_2$ | CN | 2-OCH$_3$, 4-CH$_3$, 5-CH$_3$ phenyl–N(C$_2$H$_4$OCOCH$_3$)$_2$ | blue |
| 411 | CHO | $C_6H_5SO_2$ | CN | 4-methyl, 3-NHCOCH$_3$ phenyl–N(CH$_2$CH=CH$_2$)$_2$ | blue |
| 412 | CHO | $C_6H_5SO_2$ | $CO_2C_2H_5$ | 4-methyl, 3-NHCOCH$_3$ phenyl–N(C$_6$H$_{13}$)$_2$ | blue |
| 413 | CHO | $C_6H_5SO_2$ | CN | 4-methyl, 3-CH$_3$ phenyl–N(C$_4$H$_9$)$_2$ | blue |
| 414 | CHO | $C_6H_5SO_2$ | CN | 4-methyl, 3-OCH$_3$ phenyl–N(C$_2$H$_5$)$_2$ | blue |
| 415 | CHO | $C_6H_5SO_2$ | CN | 4-methyl, 3-NHSO$_2$CH$_3$ phenyl–N(C$_2$H$_5$)$_2$ | blue |
| 416 | CHO | $C_6H_5SO_2$ | CN | 2-OCH$_3$, 5-OCH$_3$ phenyl–N(C$_2$H$_5$)$_2$ | blue |
| 417 | CHO | $C_6H_5SO_2$ | CN | 4-methyl, 3-CH$_3$ phenyl–N(C$_2$H$_5$)(C$_2$H$_4$COC$_2$H$_4$OC$_2$H$_5$) | blue |
| 418 | CHO | $C_6H_5SO_2$ | CN | 2-CH$_3$, 5-CH$_3$ phenyl–NHC$_2$H$_4$CO$_2$CH$_3$ | blue |

-continued

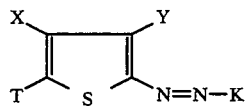

| Example No. | T | X | Y | —K | Dyeing on polyester |
|---|---|---|---|---|---|
| 419 | CHO | 4-CH₃-C₆H₄-SO₂ | CO₂C₂H₅ | 4-[N(CH₂CH=CH₂)(C₂H₄CN)]-C₆H₄– | reddish blue |
| 420 | CHO | C₆H₅SO₂ | CO₂C₂H₅ | 2-NHCOCH₃-4-N(C₂H₅)₂-C₆H₃– | blue |
| 421 | CHO | C₆H₅SO₂ | CONH₂ | 3-CH₃-4-N(C₂H₅)₂-C₆H₃– | blue |
| 422 | CHO | C₆H₅SO₂ | NO₂ | 2-NHCOCH₃-4-[N(C₂H₄CN)(C₂H₅)]-C₆H₃– | blue |
| 423 | CHO | C₆H₅SO₂ | CON(CH₃)₂ | 3-CH₃-4-N(C₂H₅)₂-C₆H₃– | blue |
| 424 | CHO | C₆H₅SO₂ | SO₂CH₃ | 3-CH₃-4-[N(C₂H₄CN)(C₂H₅)]-C₆H₃– | blue |
| 425 | CHO | CH₃SO₂ | CO₂C₂H₅ | 3-CH₃-4-[N(C₂H₄CN)(C₂H₅)]-C₆H₃– | blue |
| 426 | CHO | C₆H₅SO₂ | CN | 4-phenyl-5-methyl-2-[N(C₂H₅)₂]-thiazol-yl | blue |
| 427 | CHO | C₆H₅SO₂ | CN | 4-(4-methylphenyl)-5-methyl-2-[N(C₂H₅)₂]-thiazol-yl | blue |

-continued

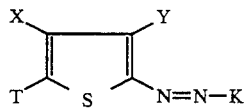

| Example No. | T | X | Y | —K | Dyeing on polyester |
|---|---|---|---|---|---|
| 428 | CHO | $CH_3SO_2$ | CN | (phenyl-substituted thiazoline with $N(C_4H_9)_2$) | blue |
| 429 | CHO | $C_6H_5SO_2$ | CN | (pyridine with $CH_3$, CN, $NHC_4H_9$, $NHC_4H_9$ substituents) | violet |
| 430 | CHO | $C_6H_5SO_2$ | CN | (methylnaphthyl-$NHC_2H_5$) | blue |
| 431 | CHO | $C_6H_5SO_2$ | $CO_2C_2H_5$ | (methylnaphthyl-$NHC_2H_4OH$) | blue |
| 432 | CHO | $C_6H_5SO_2$ | CN | (5-hydroxy-3-methyl-1-phenylpyrazole) | yellowish brown |
| 433 | CHO | $C_6H_5SO_2$ | CN | (5-amino-1-benzylpyrazole) | red |
| 434 | CHO | $C_6H_5SO_2$ | CN | (N-methyl, o-methylphenyl, phenyl enamine) | red |

-continued

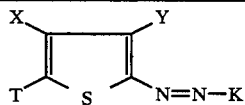

| Example No. | T | X | Y | —K | Dyeing on polyester |
|---|---|---|---|---|---|
| 435 | CHO | $C_6H_5SO_2$ | CN | 1,2,2,4-tetramethyl-N-methyl tetrahydroquinolinyl | blue |
| 436 | CHO | $C_6H_5SO_2$ | CN | 4-phenyl-3-cyano-2-morpholino-thiophene | blue |
| 437 | CHO | p-Cl—$C_6H_4SO_2$ | CN | 4-phenyl-3-cyano-2-pyrrolidino-thiophene | blue |
| 438 | CHO | $C_6H_5SO_2$ | CN | 4-phenyl-3-cyano-2-$N(C_4H_9)_2$-thiophene | blue |
| 439 | CHO | $C_6H_5SO_2$ | CN | 4-methyl-N-morpholinophenyl | violet |
| 440 | CHO | $C_6H_5SO_2$ | CN | 2,4-dihydroxy-methylphenyl | red |
| 441 | CHO | $C_6H_5SO_2$ | CN | 1-methyl-2-hydroxynaphthyl | red |
| 442 | CN | $C_6H_5SO_2$ | CN | 4-$N(C_2H_5)_2$-3-methylphenyl | blue |

-continued

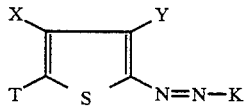

| Example No. | T | X | Y | —K | Dyeing on polyester |
|---|---|---|---|---|---|
| 443 | CN | C₆H₅SO₂ | CN | 4-methyl-N,N-bis(2-acetoxyethyl)-3-acetamidoaniline | blue |
| 444 | CN | C₆H₅SO₂ | CN | 5-methoxy-2-methyl-N,N-bis(2-acetoxyethyl)-4-acetamidoaniline | greenish blue |
| 445 | CN | CH₃SO₂ | CN | 4-methyl-N,N-diallylaniline | reddish blue |
| 446 | CN | C₆H₅SO₂ | CN | 4-phenyl-5-methyl-2-(diethylamino)thiazole | blue |
| 447 | NO₂ | C₆H₅SO₂ | CN | 4-methyl-N,N-diethylaniline | reddish blue |
| 448 | NO₂ | C₆H₅SO₂ | CN | 4-methyl-3-methyl-N,N-diethylaniline | blue |
| 449 | NO₂ | C₆H₅SO₂ | CN | 4-methyl-N,N-diethyl-3-acetamidoaniline | blue |
| 450 | NO₂ | C₆H₅SO₂ | CN | 2,5-dimethoxy-4-methyl-N,N-bis(2-acetoxyethyl)aniline | greenish blue |
| 451 | CH₃C(=O)— | C₆H₅SO₂ | CN | 4-methyl-N,N-diethyl-3-acetamidoaniline | blue |

-continued

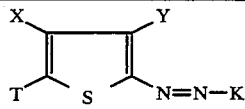

| Example No. | T | X | Y | —K | Dyeing on polyester |
|---|---|---|---|---|---|
| 452 | Cl | $C_6H_5SO_2$ | CN | ![]-N(C_2H_4OCOCH_3)_2 with NHCOCH_3 | reddish blue |
| 453 | Br | $CH_3SO_2$ | CN | ![]-N(C_2H_5)_2 with NHCOCH_3 | reddish blue |

EXAMPLE 454

1.2 parts of sodium phenylsulfinate were added to 2.3 parts of 4-chloro-3-cyano-5-formyl-2-(4'-N,N-dibutylamino-2'-acetylaminophenylazo)-thiophene in 50 parts by volume of dimethylformamide, and the mixture was stirred at room temperature. When the reaction was complete (thin layer chromatogram), the reaction mixture was poured on to 300 parts of water, and the dye formed was isolated. 2.4 parts of the dye of the formula

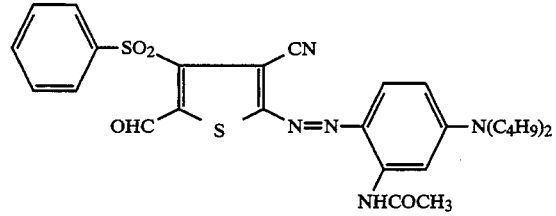

were obtained. This dye dyes polyester fibers in fast blue hues.

The dyes shown in the Table below were obtained by a method similar to Example 454.

| Example No. | T | X | Y | —K | Dyeing on polyester |
|---|---|---|---|---|---|
| 455 | CHO | $C_6H_5SO_2$ | CN | ![]-N(C_2H_5)_2 with NHCOCH_3 | blue |
| 456 | CHO | $C_6H_5SO_2$ | CN | ![]-N(C_2H_5)_2 | bluish violet |
| 457 | CHO | $C_6H_5SO_2$ | CN | ![]-N(C_2H_5)_2 with CH_3 | blue |
| 458 | CHO | $C_6H_5SO_2$ | CN | ![]-N(C_2H_4OCOCH_3)_2 with NHCOCH_3 | blue |

-continued

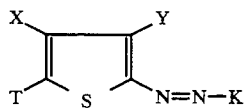

| Example No. | T | X | Y | —K | Dyeing on polyester |
|---|---|---|---|---|---|
| 459 | CHO | $C_6H_5SO_2$ | CN | ![](phenyl with NHCOCH3, N(C2H4CN)(CH2CH=CH2)) | blue |
| 460 | CHO | $C_6H_5SO_2$ | CN | ![](phenyl with NHCO-phenyl, N(C2H4CN)(C2H4OCOCH3)) | blue |
| 461 | CHO | $C_6H_5SO_2$ | CN | ![](phenyl with CH3, N(CH2CH=CH2)(C2H4CN)) | reddish blue |
| 462 | CHO | $C_6H_5SO_2$ | CN | ![](phenyl with CH3, N(C2H4CN)(C2H5)) | reddish blue |
| 463 | CHO | $C_6H_5SO_2$ | $CO_2C_5H_5$ | ![](phenyl with NHCOCH3, N(C6H13)2) | blue |

EXAMPLE 464

2.6 parts of the dye described in Example 413 were dissolved in 80 parts by volume of dioxane, 1.1 parts of ethyl cyanoacetate, 0.4 part of glacial acetic acid and 0.4 part of piperidine were added, and the mixture was stirred for 16 hours at room temperature. 50 parts of water and 50 parts of ice were then added, stirring was continued for 15 minutes, and the product was filtered off under suction, washed neutral and dried at 50° C. under reduced pressure to give 2.8 parts of the dye of the formula

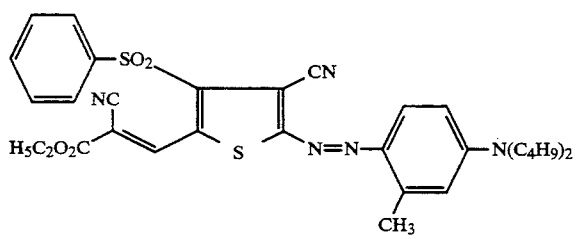

which dyes polyester fibers in fast blue hues.

EXAMPLE 465

2.3 parts of the dye described in Example 403 were dissolved in 70 parts by volume of dioxane, 1.4 parts of butyl cyanoacetate, 0.4 part of glacial acetic acid and 0.4 part of piperidine were added and the mixture was stirred for 16 hours at room temperature. 50 parts of water and 50 parts of ice were then added, stirring was continued for 1 hour and the product was filtered off under suction, washed neutral and dried to give 2.5 parts of the dye of the formula

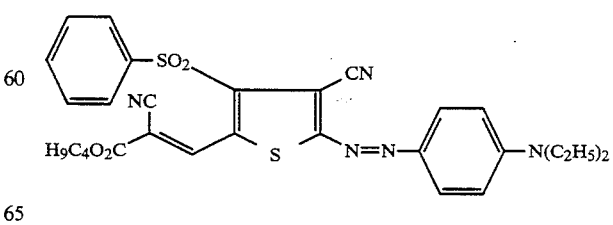

which dyes polyester fabric in fast blue hues.

The dyes shown in the Table below were obtained similarly to the above Examples.

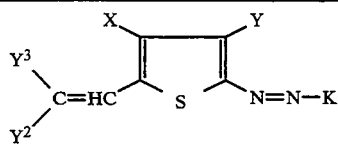

| Example No. | X | Y | Y² | Y³ | —K | Dyeing on polyester |
|---|---|---|---|---|---|---|
| 466 | C₆H₅SO₂ | CN | CN | CN | 4-methyl-3-methyl-phenyl-N(C₂H₅)(C₂H₄CN) | blue |
| 467 | C₆H₅SO₂ | CN | COCH₃ | COOC₂H₅ | 4-methyl-3-methyl-phenyl-N(C₂H₅)(C₂H₄CN) | blue |
| 468 | C₆H₅SO₂ | COOC₂H₅ | CN | COOC₂H₅ | phenyl-N(C₂H₅)₂ | blue |
| 469 | C₆H₅SO₂ | COOC₂H₅ | CN | COOC₂H₅ | 4-methyl-3-methyl-phenyl-N(C₂H₄OCOCH₃)₂ | blue |
| 470 | C₆H₅SO₂ | COOC₂H₅ | CN | COOC₂H₅ | 4-methyl-3-NHCOCH₃-phenyl-N(C₂H₅)₂ | blue |
| 471 | C₆H₅SO₂ | CN | CN | COOC₂H₅ | phenyl-N(C₂H₄OCOCH₃)₂ | reddish blue |
| 472 | C₆H₅SO₂ | CN | CN | COOC₂H₅ | 4-methyl-3-methyl-phenyl-N(C₂H₄CN)(CH₂CH=CHCl) | blue |
| 473 | C₆H₅SO₂ | CN | CN | COOC₂H₅ | 4-phenyl-5-methyl-thiazol-2-yl-N(C₂H₅)₂ | blue |
| 474 | C₆H₅SO₂ | CN | CN | COOC₂H₅ | pyridine derivative: 3-CH₃, 4-CN, 2-NHC₄H₉, 6-NHC₄H₉ | blue |

-continued

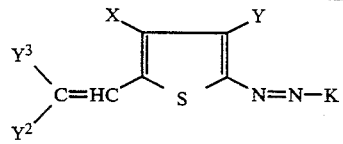

| Example No. | X | Y | $Y^2$ | $Y^3$ | —K | Dyeing on polyester |
|---|---|---|---|---|---|---|
| 475 | $C_6H_5SO_2$ | CN | CN | $COOC_2H_5$ | ![structure: 4-methyl-2-(methylsulfonamido)-N,N-diethylaniline] | blue |
| 476 | $C_6H_5SO_2$ | CN | CN | $COOC_2H_5$ | ![structure: 1-phenyl-3-methyl-5-hydroxy-4-methylpyrazole] | violet |
| 477 | $C_6H_5SO_2$ | CN | CN | $COOC_2H_5$ | ![structure: 1-benzyl-5-amino-4-methylpyrazole] | violet |
| 478 | $C_6H_5SO_2$ | CN | CN | $COOC_2H_5$ | ![structure: 2-(1-phenylpropenyl)-N-methylaniline] | violet |
| 479 | $C_6H_5SO_2$ | CN | CN | $CONHCH_3$ | ![structure: N-(2-cyanoethyl)-N-allyl-3,4-dimethylaniline] | blue |
| 480 | $C_6H_5SO_2$ | CN | CN | $CONHC_2H_5$ | ![structure: N-(2-cyanoethyl)-N-allyl-3,4-dimethylaniline] | blue |
| 481 | $C_6H_5SO_2$ | CN | CN | $SO_2CH_3$ | ![structure: N-(2-cyanoethyl)-N-allyl-3,4-dimethylaniline] | blue |
| 482 | $C_6H_5SO_2$ | CN | CN | $COCH_3$ | ![structure: N-(2-cyanoethyl)-N-allyl-3,4-dimethylaniline] | blue |

-continued

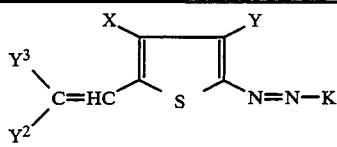

| Example No. | X | Y | Y² | Y³ | —K | Dyeing on polyester |
|---|---|---|---|---|---|---|
| 483 | C₆H₅SO₂ | CN | CN | COOCH₃ | 4-methyl-3-methyl-phenyl-N(C₂H₄CN)(CH₂CH=CH₂) | blue |
| 484 | C₆H₅SO₂ | CN | CN | COOC₄H₉(n) | 4-methyl-2-NHCOCH₃-phenyl-N(C₄H₉)₂ | greenish blue |
| 485 | C₆H₅SO₂ | CN | CN | COOC₄H₉(n) | 4-methyl-2-NHCOCH₃-phenyl-N(C₂H₅)₂ | greenish blue |
| 486 | C₆H₅SO₂ | CN | CN | COOC₄H₉(n) | 4-methyl-3-methyl-phenyl-NHC₂H₄COC₄H₉ | blue |
| 487 | C₆H₅SO₂ | CN | CN | COOC₄H₉(n) | 4-methyl-3-methyl-phenyl-N(C₂H₅)(C₂H₄COC₂H₄OC₂H₅) | blue |
| 488 | C₆H₅SO₂ | CN | CN | CO—NH—C₆H₅ | 4-methyl-3-methyl-phenyl-N(C₂H₅)(C₂H₄CN) | blue |
| 489 | C₆H₅SO₂ | CN | CN | C₆H₅ | 4-methyl-3-methyl-phenyl-N(C₂H₅)(C₂H₄CN) | blue |
| 490 | C₆H₅SO₂ | CN | CN | benzimidazol-2-yl | 4-methyl-3-methyl-phenyl-N(C₂H₅)(C₂H₄CN) | blue |
| 491 | C₆H₅SO₂ | CN | CN | CONH₂ | 4-methyl-3-methyl-phenyl-N(C₂H₅)(C₂H₄CN) | blue |

-continued

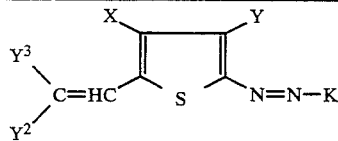

| Example No. | X | Y | Y² | Y³ | —K | Dyeing on polyester |
|---|---|---|---|---|---|---|
| 492 | CH₃SO₂ | CN | CN | COOC₂H₅ | ![structure with -N(C₂H₅)₂ and H₃C] | blue |
| 493 | CH₃SO₂ | CN | CN | COOC₂H₅ | ![structure with N(C₂H₄CN)(CH₂CH=CH₂) and H₃C] | blue |
| 494 | CH₃SO₂ | CN | CN | COOC₂H₅ | ![structure with N(C₂H₄OCH₃)(C₂H₄CN) and H₃C] | blue |
| 495 | p-Cl—C₆H₄SO₂ | CN | CN | —C₆H₅ (phenyl) | ![structure with N(C₂H₄CN)(CH₂CH=CH₂) and H₃C] | blue |

EXAMPLE 496 a) 14.6 parts of 2-amino-3-cyano-5-formyl-4-phenyl-sulfonylthiophene were suspended in 50 parts by volume of ethanol, and 1 part of glacial acetic acid and 1 part of piperidine were added. 13 parts by volume of ethyl cyanoacetate were then added dropwise at room temperature, and the mixture was stirred for 5 hours at 60° C. The reaction mixture was poured on to 800 parts of water, and the precipitate was filtered off under suction, washed with water and dried at 50° C. under reduced pressure to give 16 parts of 2-amino-3-cyano-4-phenylsulfonyl-5-(β-cyano-β-carboethoxyvinyl)-thiophene of the formula

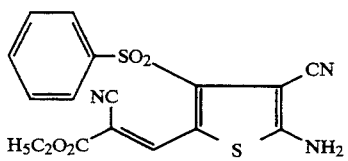

which was reacted without further purification.

b) 3.9 parts of 2-amino-3-cyano-4-phenylsulfonyl-5-(β-cyano-β-carboethoxyvinyl)-thiophene in 35 parts by volume of a 3:1 glacial acetic acid/propionic acid mixture were stirred, and 3.5 parts of nitrosylsulfuric acid (11.5% of N₂O₃) were slowly added at 0°–5° C. After 2 hours at this temperature, the diazonium salt solution was run into a solution of 2 parts of N-cyanoethyl-N-ethyl-m-toluidine in a mixture of 25 parts of water, 100 parts of ice, 5 parts by volume of 32% strength hydrochloric acid and 0.2 part of amidosulfonic acid. When coupling was complete, the dye was filtered off under suction, washed neutral and dried under reduced pressure. 4.5 parts of the dye of the formula

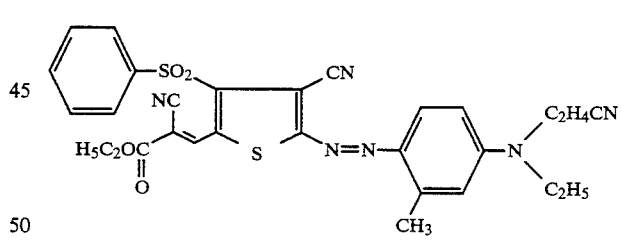

were obtained. On polyester fibers, this dye gives blue dyeings having in general very good fastness properties.

EXAMPLE 497

3.4 parts of 2-amino-3-cyano-4-phenylsulfonyl-5-(β,β-dicyanovinyl)-thiophene were suspended in 25 parts by volume of 85% strength phosphoric acid and slowly reacted with 3.5 parts of nitrosylsulfuric acid (11.5% of N₂O₃) at 0°–5° C., and the mixture was stirred for 2 hours at this temperature. This diazonium salt solution was run slowly into a mixture of 1.5 parts of N,N-diethylaniline, 20 parts of water, 60 parts of ice, 5 parts by volume of 32% strength hydrochloric acid and 0.2 part of amidosulfonic acid. When coupling was complete, the suspension was filtered and the dye was washed neutral and dried. 4.2 parts of the dye of the formula

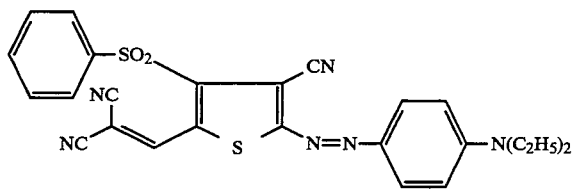

were obtained. On polyesters, this dye gives blue dyeings having generally good fastness properties.

The compounds shown in the Table below were obtained in a similar manner.

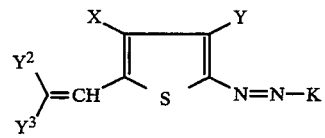

| Example No. | X | Y | $Y^2$ | $Y^3$ | —K | Dyeing on polyester |
|---|---|---|---|---|---|---|
| 498 | $CH_3SO_2$ | CN | CN | $COOCH_3$ | —C$_6$H$_4$—N(C$_2$H$_5$)$_2$ | blue |
| 499 | $C_6H_5SO_2$ | CN | CN | $COOCH_3$ | —C$_6$H$_4$—N(C$_2$H$_4$OCOCH$_3$)$_2$ | blue |
| 500 | $C_6H_5SO_2$ | CN | CN | $COOCH_3$ | —C$_6$H$_3$(NHCOCH$_3$)—N(C$_2$H$_5$)$_2$ | greenish blue |
| 501 | $C_6H_5SO_2$ | CN | CN | $COOCH_3$ | 4-phenyl-5-methyl-2-(N(C$_2$H$_5$)$_2$)-thiazole | greenish blue |
| 502 | $C_6H_5SO_2$ | CN | CN | $COOC_2H_5$ | —C$_6$H$_4$—N(CH$_2$CH=CH$_2$)$_2$ | blue |
| 503 | $C_6H_5SO_2$ | CN | CN | $COOC_2H_5$ | —C$_6$H$_3$(CH$_3$)—N(C$_4$H$_9$)$_2$ | blue |
| 504 | $C_6H_5SO_2$ | CN | CN | $COOC_2H_5$ | —C$_6$H$_4$—N(C$_2$H$_4$CN)(CH$_2$CH=CH$_2$) | blue |
| 505 | $C_6H_5SO_2$ | CN | CN | $COOC_2H_5$ | 4-phenyl-5-methyl-2-(N(C$_2$H$_5$)$_2$)-thiazole | greenish blue |

-continued

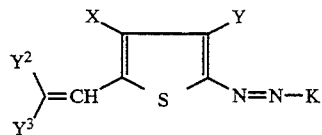

| Example No. | X | Y | Y² | Y³ | —K | Dyeing on polyester |
|---|---|---|---|---|---|---|
| 506 | C₆H₅SO₂ | CN | CN | CONHCH₃ |  —N(C₂H₅)₂ | blue |
| 507 | C₆H₅SO₂ | COOCH₃ | CN | COOC₂H₅ |  —N(C₂H₅)₂ | blue |

Examples of suitable dischargeable dyes are the compounds of Examples 21, 22, 113 and 114 and those of Examples 341-355.

We claim:
1. A compound of the formula:

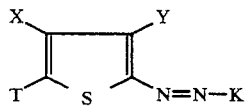

wherein
X is fluorine, chlorine or bromine;
Y is cyano;
T is hydrogen; C₁-C₄-alkyl; Cl; Br; NO; NO₂; SO₃H; CHO; CN; CH₃CO; C₂H₅CO; C₆H₅CO; CH₃SO₂; C₂H₅SO₂; C₆H₅SO₂; or —CH=B;
B is C(CN) (Z) where Z is cyano; nitro; alkanoyl; aroyl; alkylsulfonyl; arylsulfonyl; carboxyl; a carboxylic ester group; unsubstituted carbamyl; substituted carbamyl; or a radical of a compound of one of the formulae:

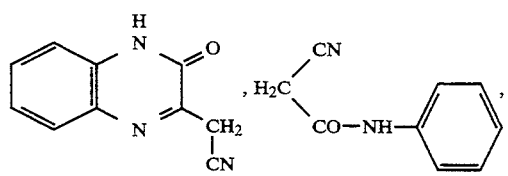

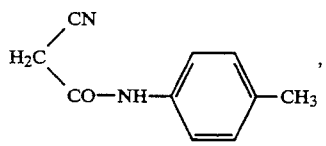

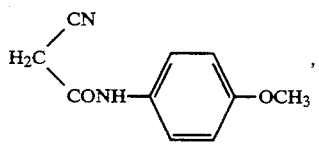

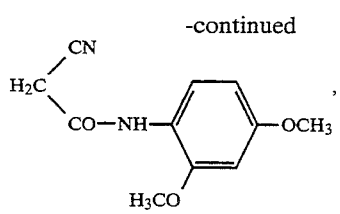

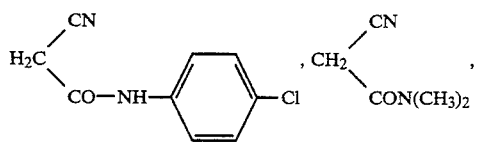

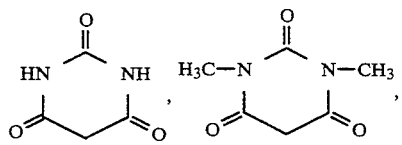

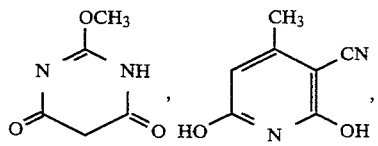

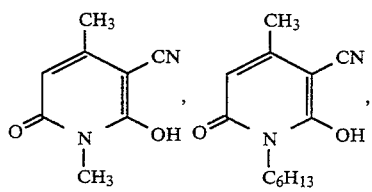

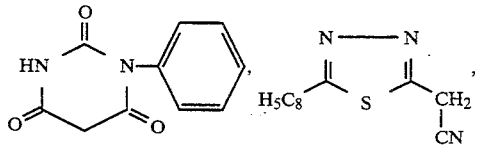

and
K is a radical derived from a coupling component of the formula:

wherein:
B¹ is hydrogen or $B^2$;
B² is $C_1$-$C_6$-alkyl, $C_1$-$C_6$-alkyl substituted by chlorine, bromine, hydroxyl, $C_1$-$C_8$-alkoxy, phenoxy, phenyl, cyano, carboxyl, $C_1$-$C_8$-alkanoyloxy, $C_1$-$C_8$-alkoxy-$C_1$-$C_4$-alkoxy, benzoyloxy, o-, m- or p-methylbenzoyloxy, o-, m- or p-chlorobenzoyloxy, $C_1$-$C_8$-alkoxyalkanoyloxy, phenoxyalkanoyloxy, $C_1$-$C_8$-alkoxycarbonyloxy, $C_1$-$C_8$-alkoxyalkoxycarbonyloxy, benzyloxycarbonyloxy, phenethoxycarbonyloxy, phenoxyethoxycarbonyloxy, $C_1$-$C_8$-alkylaminocarbonyloxy, cyclohexylaminocarbonyloxy, phenylaminocarbonyloxy, $C_1$-$C_8$-alkoxycarbonyl, $C_1$-$C_8$-alkoxyalkoxycarbonyl, phenoxycarbonyl, benzyloxycarbonyl, phenoxy-$C_1$-$C_4$-alkoxy, phenylethoxycarbonyl, phenyl, or cyclohexyl; and $R^6$ is cyano; carbamyl; nitro; acetyl; alkoxycarbonyl; methylaminocarbonyl; dimethylaminocarbonyl; ethylaminocarbonyl; diethylaminocarbonyl; methoxyethoxycarbonyl; ethoxyethoxycarbonyl; n-propoxyethoxycarbonyl; isopropoxyethoxycarbonyl; n-butoxyethoxycarbonyl; isobutoxyethoxycarbonyl; or sec.-butoxyethoxycarbonyl.

2. The compound of claim 1, wherein X is fluorine.
3. The compound of claim 1, wherein X is chlorine.
4. The compound of claim 1, wherein X is bromine.
5. The compound of claim 1, wherein T is hydrogen or $C_{1-4}$ alkyl.
6. The compound of claim 1, wherein T is Cl or Br.
7. The compound of claim 1, wherein T is NO or $NO_2$.
8. The compound of claim 1, wherein T is $SO_3H$, $CH_3SO_2$, $C_2H_5SO_2$ or $C_6H_5SO_2$.
9. The compound of claim 1, wherein T is CHO, $CH_3CO$, $C_2H_5CO$ or $C_6H_5CO$.
10. The compound of claim 1, wherein T is CN.
11. The compound of claim 1, wherein T is —CH=B, wherein B is as defined above.
12. The compound of claim 1, wherein $R^6$ is cyano.
13. The compound of claim 1, wherein $R^6$ is carbamyl.
14. The compound of claim 1, wherein $R^6$ is nitro.
15. The compound of claim 1, wherein $R^6$ is acetyl.
16. The compound of claim 1, wherein $R^6$ is alkoxycarbonyl.
17. The compound of claim 1, wherein $R^6$ is selected from the group consisting of aminocarbonyl, methylaminocarbonyl, dimethylaminocarbonyl, ethylaminocarbonyl, diethylaminocarbonyl, methoxycarbonyl, ethoxycarbonyl, n-propoxycarbonyl, isopropoxycarbonyl, n-butoxycarbonyl, isobutoxycarbonyl, sec.-butoxycarbonyl, methoxyethoxycarbonyl, ethoxyethoxycarbonyl, n-propoxyethoxycarbonyl, isopropoxyethoxycarbonyl, n-butoxyethoxycarbonyl, isobutoxyethoxycarbonyl and sec.-butoxyethoxycarbonyl.

* * * * *